(12) United States Patent
Holman, IV et al.

(10) Patent No.: US 8,630,686 B2
(45) Date of Patent: *Jan. 14, 2014

(54) MOBILE DEVICE SLIDE SYSTEM AND METHOD

(75) Inventors: Martin Earl Holman, IV, Sunrise, FL (US); Jason Tyler Griffin, Kitchener (CA); Aaron Robert Allen, Sunrise, FL (US); Martin Riddiford, London (GB); Julia Allwright, London (GB); James Fullalove, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 906 days.

This patent is subject to a terminal disclaimer.

(21) Appl. No.: 12/715,209

(22) Filed: Mar. 1, 2010

(65) Prior Publication Data

US 2010/0273542 A1 Oct. 28, 2010
US 2011/0086682 A2 Apr. 14, 2011

Related U.S. Application Data

(63) Continuation-in-part of application No. 12/394,238, filed on Feb. 27, 2009, now Pat. No. 8,126,521.

(30) Foreign Application Priority Data

Feb. 27, 2009 (EP) ..................................... 09154021

(51) Int. Cl.
*H05K 7/20* (2006.01)

(52) U.S. Cl.
USPC .................. 455/575.4; 455/575.3; 455/575.8

(58) Field of Classification Search
USPC ..................... 455/575.1, 575.3, 575.4, 575.8; 379/433.01, 433.11–433.13
See application file for complete search history.

(56) References Cited

U.S. PATENT DOCUMENTS

| 7,209,772 | B2 | 4/2007 | Crisp |
| 7,363,066 | B2 | 4/2008 | Im et al. |

(Continued)

FOREIGN PATENT DOCUMENTS

| EP | 1793568 | 6/2007 |
| EP | 1858234 | 11/2007 |

(Continued)

OTHER PUBLICATIONS

Extended European Search Report Application No. 10155105.9; retrieved Jun. 9, 2010.

(Continued)

*Primary Examiner* — Sujatha Sharma
(74) *Attorney, Agent, or Firm* — Hanley, Flight & Zimmerman, LLC

(57) ABSTRACT

A slide system for a mobile device including a base portion and a slide portion configured to slide in relation to the base portion, the system including: at least one base magnet provided to the base portion; a plurality of slide magnets provided to the slide portion and configured such that the plurality of slide magnets are aligned to the at least one base magnet at predetermined positions during movement of the slide portion relative to the base portion; and a magnetically active element provided to the slide portion in spatial relation to at least one of the plurality of slide magnets such that magnetic forces between the at least one of the plurality of slide magnets and the at least one base magnet are affected. In particular, the magnetic forces can be altered to provide an altered "feel" to the sliding movement by lowering repulsive forces and increasing attractive forces.

38 Claims, 32 Drawing Sheets

(56) References Cited

U.S. PATENT DOCUMENTS

| | | |
|---|---|---|
| 7,599,723 B2 | 10/2009 | Lee et al. |
| 2005/0009581 A1 | 1/2005 | Im et al. |
| 2007/0032278 A1 | 2/2007 | Lee et al. |
| 2007/0091582 A1 | 4/2007 | Ku et al. |
| 2007/0097607 A1 | 5/2007 | Lee |
| 2008/0015002 A1 | 1/2008 | Crisp |
| 2008/0058034 A1 | 3/2008 | Lu et al. |
| 2009/0015996 A1 | 1/2009 | Chang et al. |
| 2009/0168339 A1 | 7/2009 | Lee |
| 2009/0233660 A1 | 9/2009 | Demuynck |

FOREIGN PATENT DOCUMENTS

| | | |
|---|---|---|
| EP | 1944951 | 7/2008 |
| GB | 2387062 | 10/2003 |
| WO | 2006/006776 | 1/2006 |

OTHER PUBLICATIONS

European Search Report Application No. 09154021.1; retrieved Jul. 24, 2009.

United States Patent and Trademark Office, office action issued in U.S. Appl. No. 12/394,238, dated Jul. 13, 2011, 18 pages.

Samsung, Review: Samsung F400, www.mobile-phones-uk.org.uk, retrieved from the internet on May 14, 2009, 3 pages.

Louis Ramirez, Samsung SGH-F520 Cellphone Slides Up and Down, Side to Side: Rubik's and iPhone Clone?, Gizmodo, www.gizmodo.com, Feb. 12, 2007, retrieved from the internet on May 14, 2009, 3 pages.

Wikipedia, Nokia N95,www.wikipedia.org, retrieved from the internet on May 14, 2009, 8 pages.

Gadget News and Reviews, Helio-Pantech-PN-810, iTech News Net, www.itechnews.net, retrieved from the internet on May 14, 2009, 1 page.

European Patent Office, Examination Report issued in European application 09154021.1, dated Sep. 20, 2011, 4 pages.

Corrected Extended European Search Report for EP App. No. 10155105.9, dated Jun. 9, 2010.

United States Patent and Trademark Office, Notice of Allowance issued in U.S. Appl. No. 12/394.238, mailed on Oct. 24, 2011, 18 pages.

Canadian Intellectual Property Office, Office Action issued in Canadian Patent Application No. 2,732,994, dated Nov. 27, 2012, 4 pages.

European Patent Office, Communication pursuant to Article 94(3) EPC issued in European Application No. 10155105.9, dated Nov. 26, 2012, 4 pages.

Europen Patent Office, Communication pursuant to Article 94(3) EPC issued in EP Application No. 09154021.1, dated Jan. 30, 2013, 5 pages.

Canadian Intellectual Property Office, Office Action for CA Patent Application No. 2,689,769, dated Oct. 23, 2012, 4 pages.

US 8,630,686 B2

MOBILE DEVICE SLIDE SYSTEM AND METHOD

CROSS-REFERENCE TO RELATED APPLICATIONS

The present application is a continuation-in-part of U.S. application Ser. No. 12/394,238, filed Feb. 27, 2009, and claims priority to EP App. No. 09154021.1, filed on Feb. 27, 2009. Said applications are expressly incorporated herein by reference in its entirety.

FIELD

This application relates to a system and method for a slide mechanism on a mobile device and, in particular, to a system and method for assisted slide movement on a mobile device using magnetism.

BACKGROUND

Mobile communication devices are in use throughout everyday life. One common aspect of the design and development of mobile communication devices is that there is an ongoing movement to reduce the size of devices and to provide increased functionality and ease of use even though the size is being reduced.

Conventional attempts to provide additional functionality in a smaller package have resulted in mobile communication devices that are described as a "flip phone" in which a hinge is provided and the mobile communication device opens in a clam shell fashion to reveal additional functions on both parts of the flipped device. Another conventional method to add functionality has been the use of a slide function in which the face or a portion of the mobile communication device is slid along a base of the mobile communication device to reveal, for example, a keyboard or the like. More recently, some conventional devices have the capability of sliding the face or first portion in either of two directions to provide additional access to certain functionality. For example, sliding the cover in one direction may reveal a keyboard while in another direction may reveal telephone keys.

These existing solutions present certain problems with regard to the user accessing functions. For example, with the flip phone concept, the user must entirely open the phone to access the functions. Further, with the slide phone concept, the user must open the phone fully to access the functionality and in the situation of two directional sliding, the user may not be able to access both levels of functionality at the same time.

Existing slide mechanisms typically make use of mechanical stops, springs or the like, which act to hold the slide at particular positions. These slide mechanisms require forces to be applied when sliding the slide mechanism and can result in a "clunky" feel to the sliding motion.

As such there is a need for an improved system and method for a slide mechanism for mobile devices.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

DETAILED DESCRIPTION

Figure 1:
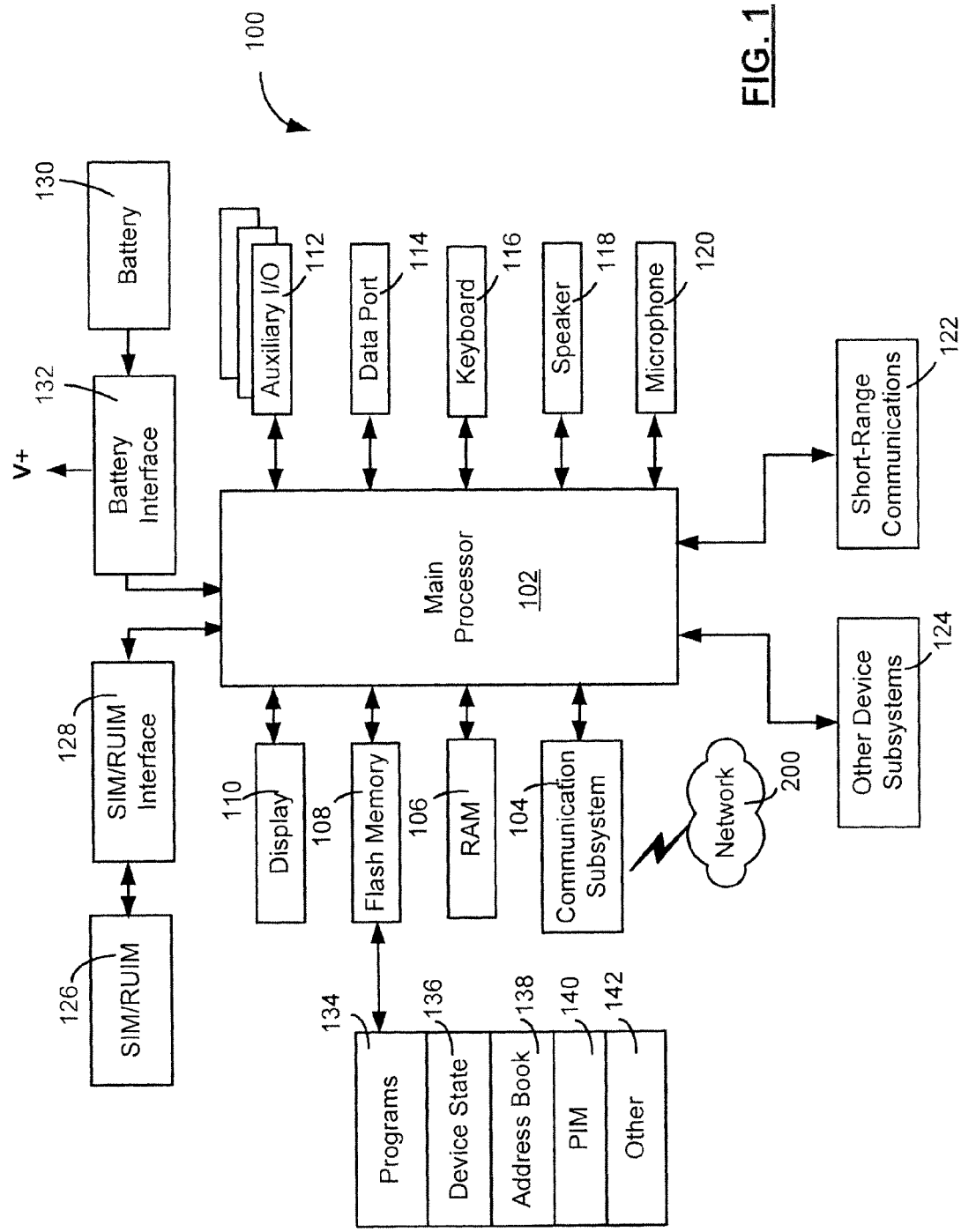
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

According to one aspect herein, there is provided a slide system for a mobile device, the mobile device comprising a base portion and a slide portion configured to slide in relation to the base portion, the system including: at least one base magnet provided to the base portion; a plurality of slide magnets provided to the slide portion and configured such that the plurality of slide magnets are aligned to the at least one base magnet at predetermined positions during movement of the slide portion relative to the base portion; and a magnetically active element provided to the slide portion in spatial relation to at least one of the plurality of slide magnets such that magnetic forces between the at least one of the plurality of slide magnets and the at least one base magnet are affected. In particular, by using the magnetically active element, the magnetic forces can be altered to provide an altered "feel" to the sliding movement by having lower repulsive forces and increased attractive forces.

In various cases, the base magnet may be replaced by a steel plate; at least one of the magnets may be a magnet having a steel surround; or at least one of the magnets may be a magnet having a steel cover.

In another particular case, the magnetically active element may be a steel sheet in the plane of the slide magnets, the steel sheet provided with cut-out portions configured to receive the slide magnets. In this case, the steel sheet may also provided with oblong cut-out portions connecting the cut-out portions for the slide magnets.

In another particular case, the magnetically active element may include at least one of the plurality of slide magnets having a reversed polarity in comparison to others of the plurality of slide magnets. In this case, the reversed polarity slide magnet may be positioned in an otherwise non-magnetic zone.

In yet another particular case, the system may further include: a rail provided in the base portion; and a bridge element provided between the base portion and the slide portion that supports the slide portion and is engaged with the rail to allow sliding movement of the bridge element along the rail. Alternatively, the system may further include: a rail provided in the base portion; and an engagement portion provided to the slide portion that engages with the rail to allow sliding movement of the slide portion along the rail.

According to another aspect herein, there is provided a slide system for a mobile device, the mobile device comprising a base portion and a slide portion configured to slide in relation to the base portion, the system including: at least one base magnet provided to the base portion; a plurality of slide magnets provided to the slide portion and a plurality of slide magnets provided to the slide portion and configured such that the plurality of slide magnets are aligned to the at least one base magnet at predetermined positions during movement of the slide portion relative to the base portion and wherein at least some of the plurality of slide magnets are associated with stop locations for the slide portion in relation to the base portion; and wherein at least one of the plurality of slide magnets has a reversed polarity in comparison to others of the plurality of slide magnets and is positioned in order to bridge a non-magnetic zone between slide magnets associated with the stop locations.

In a particular case, the system may further include: a magnetically active element provided to the slide portion in spatial relation to at least one of the plurality of slide magnets such that magnetic forces between the at least one of the plurality of slide magnets and the at least one base magnet are affected. In this case, the magnetically active element may be a steel sheet in the plane of the slide magnets, the steel sheet provided with cut-out portions configured for receiving the slide magnets. Further, the steel sheet may also be provided with oblong cut-out portions connecting the cut-out portions for the slide magnets.

According to yet another aspect herein, there is provided a slide method for a mobile device including: when the mobile device is in a closed position, applying a force to a slide portion of the mobile device in relation to a base portion of the mobile device to open the mobile device; providing a detent mechanism configured to allow the slide portion to be held at a first mode position in which a first user input area is available, wherein the detent mechanism includes: at least one base magnet provided to the base portion; a plurality of slide magnets provided to the slide portion and configured such that the plurality of slide magnets are aligned to the at least one base magnet at predetermined positions during movement of the slide portion relative to the base portion; and a magnetically active element provided to the slide portion in spatial relation to at least one of the plurality of slide magnets such that magnetic forces between the at least one of the plurality of slide magnets and the at least one base magnet are affected, and from the first mode position, applying a further force to move the slide portion to a second mode position in which a second user input area is available.

In a particular case, the method may further include changing the function of the first user input area when moving from the first mode position to the second mode position. In this case, the changing the function of the first user input area may include changing a function of at least one input control within the first user input area.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a user input system 116, such as a keyboard, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the user input system 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the user input system 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The user input system 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
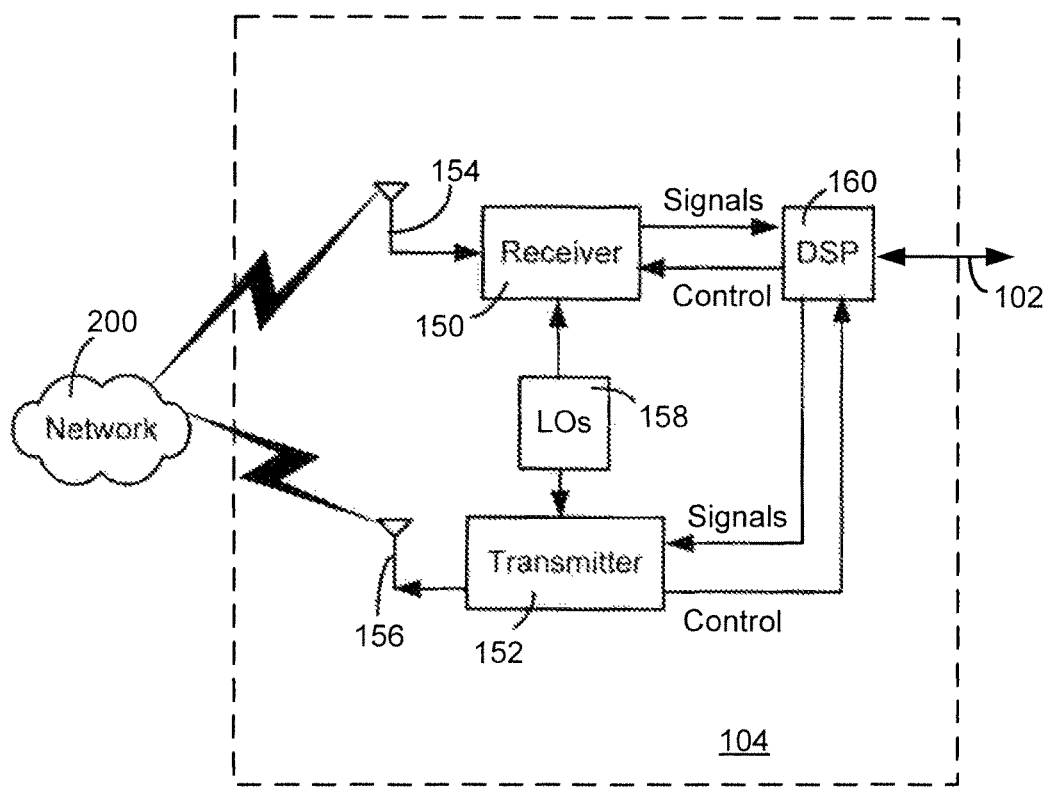
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gain/attenuation applied to communication signals in the receiver 150 and transmitter 152 can be adaptively controlled through automatic gain/attenuation control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
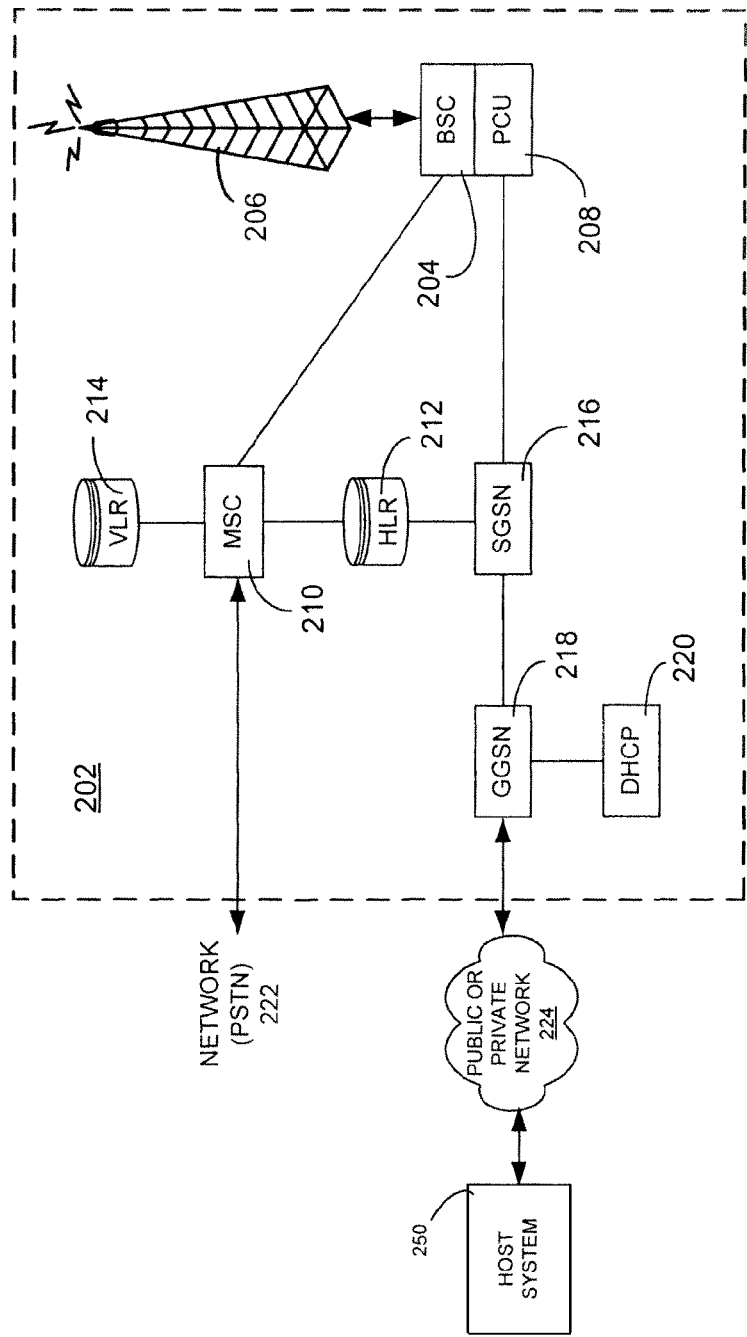

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Using the above described general mobile device environment as an exemplary environment for communications, the following description relates to user input systems and methods that can be applied to the mobile device described above. Generally speaking, the user input system makes use of an in-line dual mode sliding feature to allow a user to access some functions when a first portion of the mobile device is slid to a first position and additional functions when the first portion is slid in the same direction to a second position.

Figure 4A:
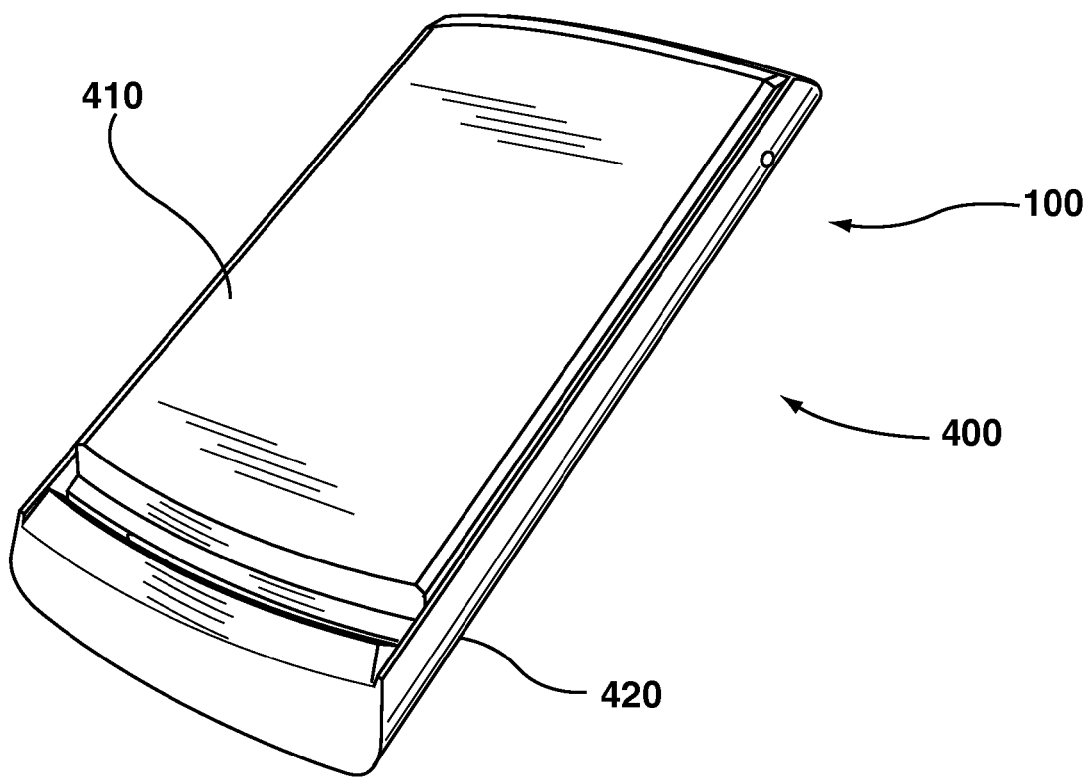
FIG. 4A to 4C illustrate an example embodiment of a multi-mode user input system.
Figure 4B:
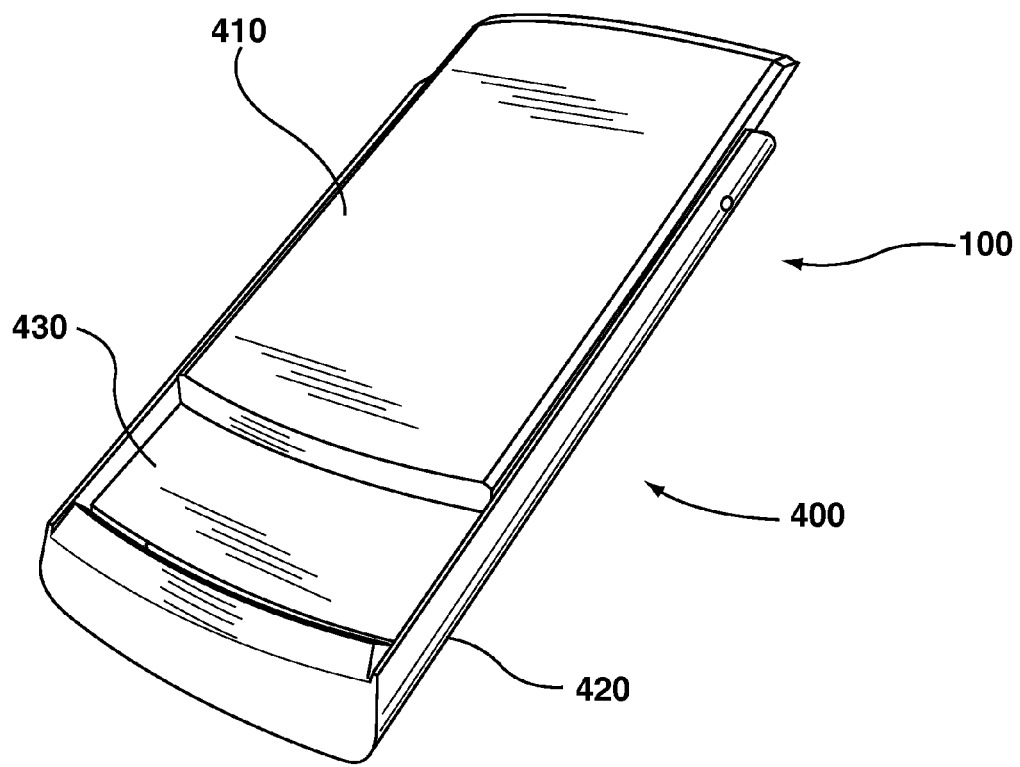
Figure 4C:
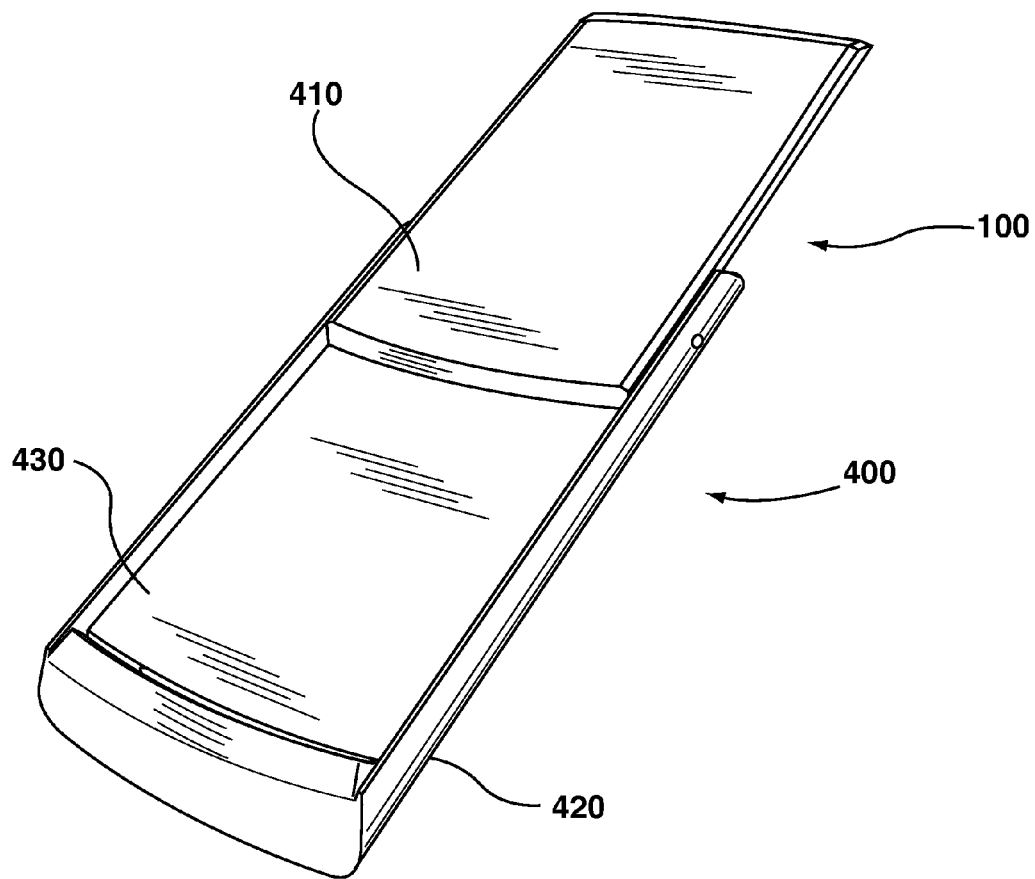

FIG. 4A to 4C illustrate an example embodiment of a multi-mode user input system 400. In FIG. 4A, the mobile device 100 is in a closed position in which a first portion 410 of the mobile device 100 is positioned generally overtop of a second portion 420. In FIG. 4B, the mobile device 100 is in a first mode position in which the first portion 410 of the mobile device 100 has been moved (in this embodiment by sliding) relative to the second portion 420 of the mobile device 100. In the first mode position, the user may have access to a first user input area 430 (sometimes referred to as a partial user input area) providing some predetermined level of functionality, such as, for example, a plurality of input controls such as multimedia keys (not shown) each having a function to, for example, allow the playing, rewinding, recording or the like of music or media content. In FIG. 4C, the mobile device 100 is in a second mode position in which the first portion 410 has been moved relative to the second portion 420 in the same direction. The user now has access to a second user input area 440 (sometimes referred to as an open user input area). The second user input area 440 may provide both the first mode functionality and additional second mode functionality for user input. For example, the user may now be able to access a larger number of input controls, such as a keyboard layout like a telephone or QWERTY key set.

It will be understood that in some embodiments, the first and second user input areas 430/440 may include physical keys. In other embodiments, the first and second user input areas 430/440 may involve a touch screen that may provide an image of keys to the user. In either case, the assigned functionality of the first mode user input area and the second mode user input area may be adjusted such that the user input(s) available in the first mode may have their functionality reassigned or adjusted based on a move by the user of the mobile device to the second mode. With physical keys, this may be achieved by having multiple functions assigned to (and, in some cases, visible on) each key.

This use of an in-line multi-mode sliding system 400 provides the advantages that the user of the mobile device 100 does not need to fully open the mobile device 100 to access certain types of functionality. Further, if the user is using the first mode of functionality, there is no need to transition through a closed position to access the additional functionality of the second mode of the input system. Still further, if the user only opens to the first mode or if the user moves to the first mode from the second mode, the mobile device 100 may be configured to automatically (or provide a prompt asking if to) change applications to an application associated with the first mode. This allows the move to the first mode to act as a shortcut key to automatically perform a function. The user benefits from easier access to an application such as, for example, a music player, in the first mode position, while using another application such as, for example, e-mail, in the second mode position. A return to the second mode position can then return the user to the e-mail application.

Figure 5:
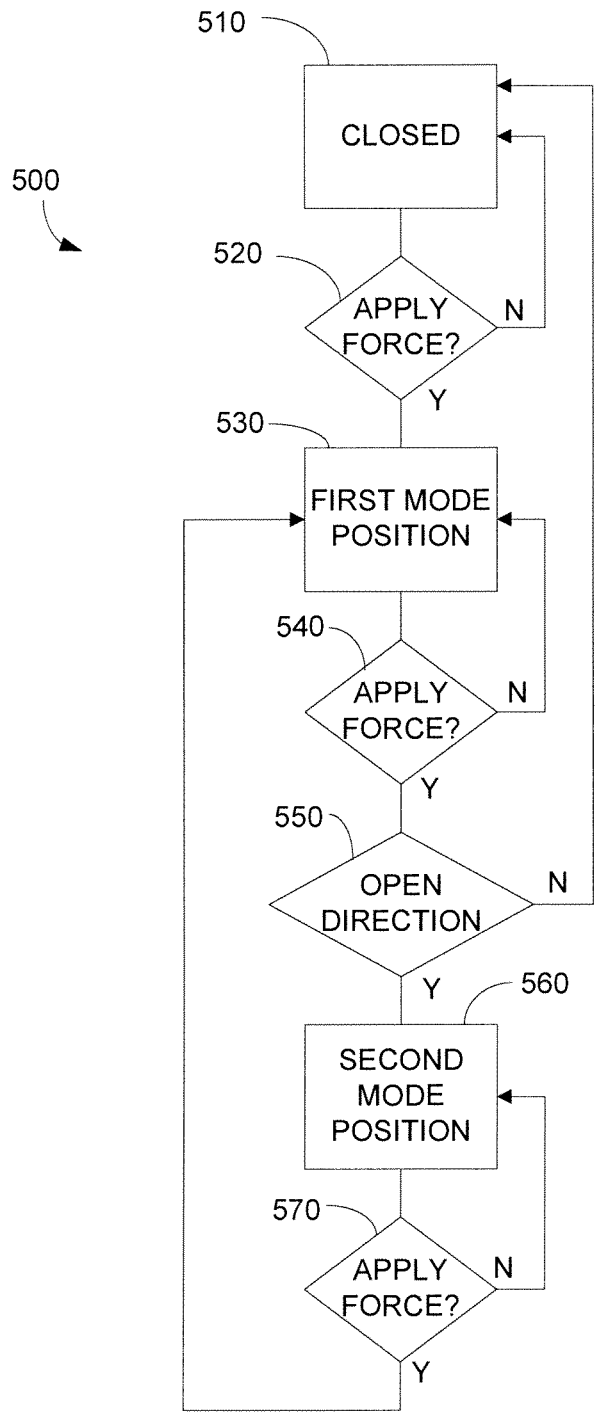
FIG. 5 shows a flowchart of a multi-mode user input method according to an exemplary embodiment.

FIG. 5 shows a flowchart of an example embodiment of a multi-mode user input method 500. In this method 500, the mobile device 100 starts in a closed position (510). The user then typically applies a force (520) to slide the first portion 410 of the mobile device 100 a predetermined distance to the first mode position, at which point a locking/detent mechanism (described further herein) engages to maintain the first portion 410 in positional relation to the second portion 420 of the mobile device 100 (520). By exerting additional force (540), the user is able to overcome the locking/detent mechanism to allow the user to move the first portion 410 in relation to the second portion 420. If the force is in the opening direction, the first portion 410 is moved in relation to the second portion 420 a second predetermined distance to a second mode position (560) At the second predetermined distance, an open locking/detent mechanism engages to maintain the first portion 410 in positional relation to the second portion 420. The user is then able to apply additional force (570) to overcome the open locking/detent mechanism to return the first portion 410 to the first mode position (520) or, via further force, to the closed position (510).

Having outlined the general approach to an in-line multi-mode user input system and method above, it will be understood that there are various slide mechanisms and locking/detent mechanisms that may be used to implement the user input system and method. The following description and figures provide various example implementations but it should be understood that these examples are not intended to be limiting.

Figure 6:
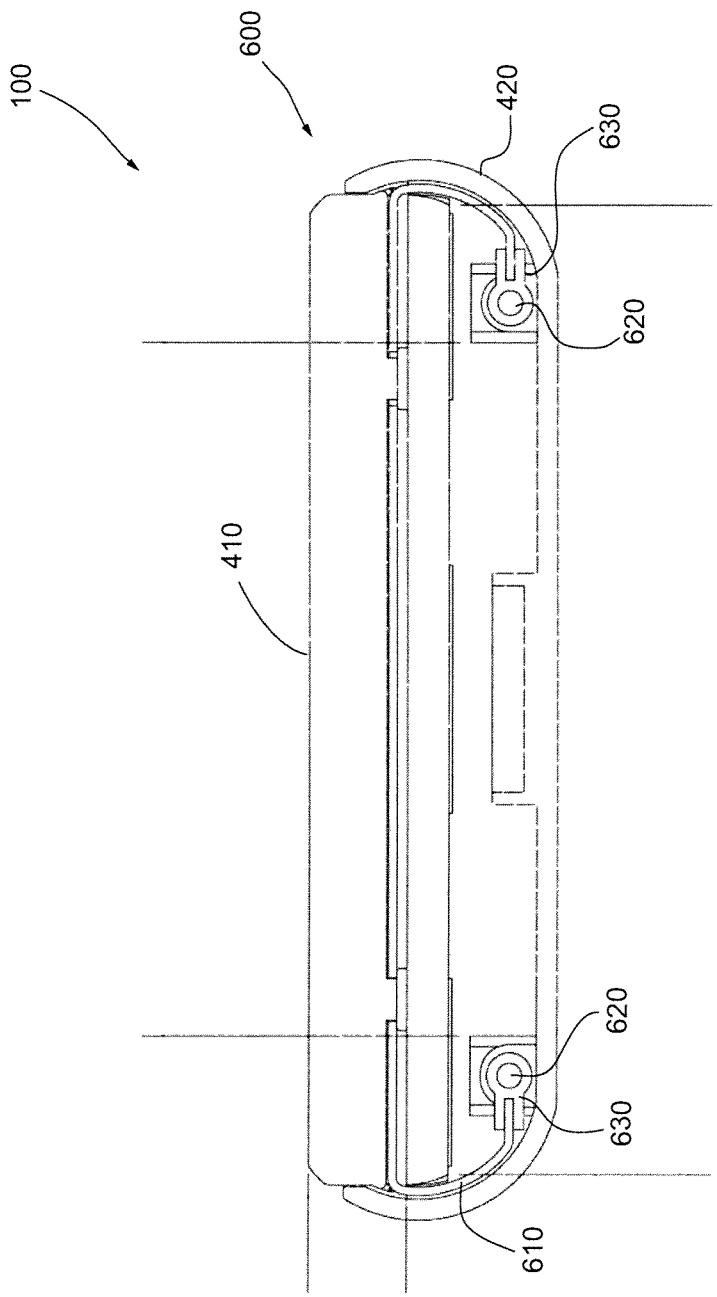
FIG. 6 shows a schematic diagram of an example sliding mechanism for a mobile device.

FIG. 6 shows a schematic diagram of an example embodiment of a sliding mechanism 600 for a mobile device 100. In this embodiment, a first portion 410 of the mobile device 100 is mounted on a bridge element 610 that is then supported on a rail or rails 620 that are provided in the second portion 420 of the mobile device 100. In this particular embodiment, the sliding mechanism 600 includes clips 630 that engage the bridge element 610 to the rails 620. The first portion 410 may be slidably moved relative to the second portion 420 by movement of the bridge element 610 along the rails 620.

Figure 7:
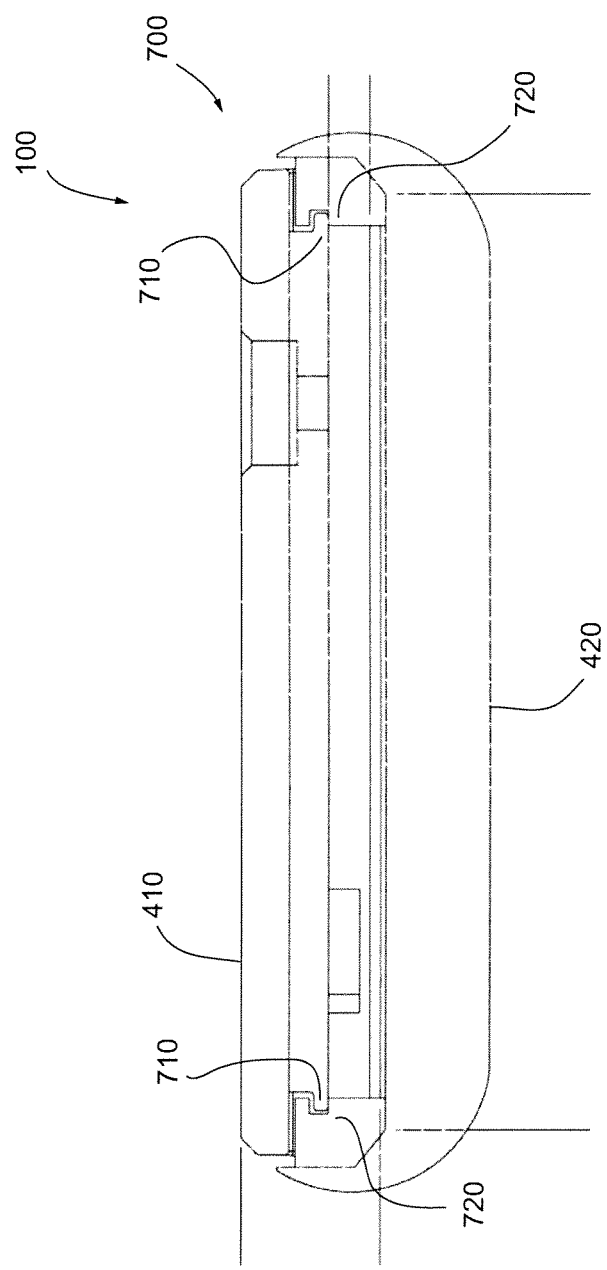
FIG. 7 shows a schematic diagram of another embodiment of a sliding mechanism 700 for a mobile device 100.

FIG. 7 shows a schematic diagram of another embodiment of a sliding mechanism 700 for a mobile device 100. In this embodiment, the first portion 410 of the mobile device 100 is provided with engagement portions 710 which engage with rail portions 720 provided in the second portion 420 of the mobile device 100. This allows the first portion 410 to slide relative to the second portion 420 while remaining engaged with the second portion 420.

Figure 8:
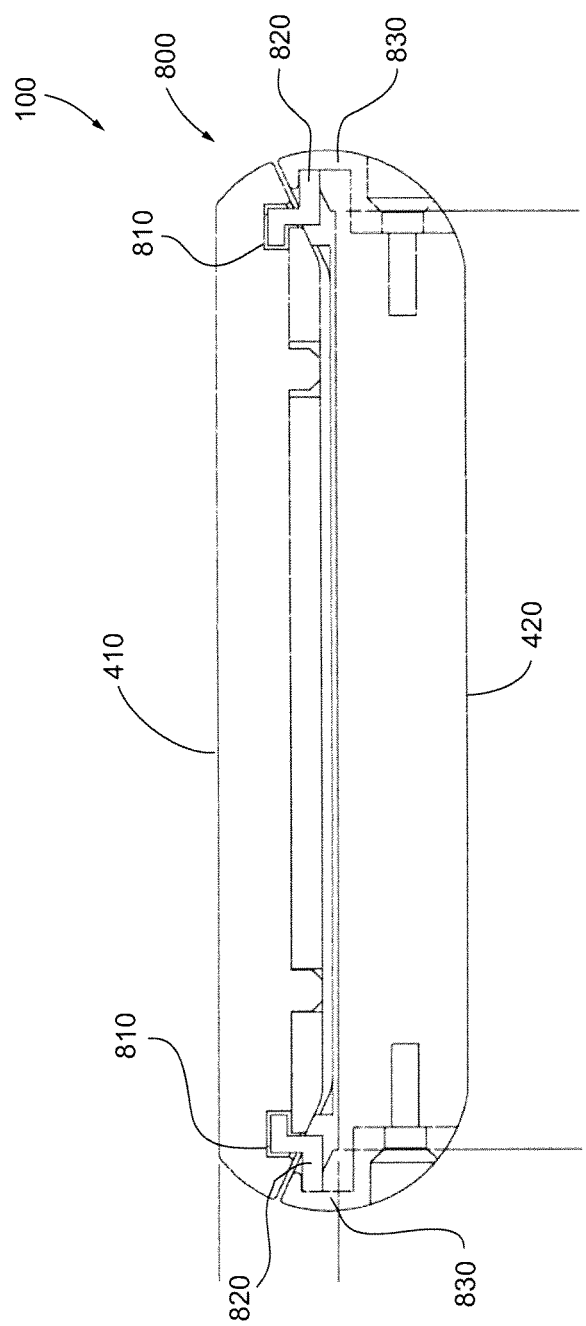
FIG. 8 is a schematic diagram of another embodiment of a sliding mechanism 800 for a mobile device 100.

FIG. 8 is a schematic diagram of another embodiment of a sliding mechanism 800 for a mobile device 100. In this embodiment, the first portion 410 is configured with an upper slot 810 for engaging with an engagement system 820 such that the first portion 410 is supported by the engagement system 820. The second portion 420 is also configured with a lower slot 830 to engage with the engagement system 820. Thus, this embodiment is intended to incorporate the support of the bridge embodiment and the engagement of the rail embodiment.

As well as having a slide mechanism for the first portion 410 over the second portion 420, the multi-mode user input system 400 is also provided with a locking/detent mechanism to allow the first portion 410 to be held at the first mode position and, in some embodiments, also at the closed and second mode position.

Figure 9A:
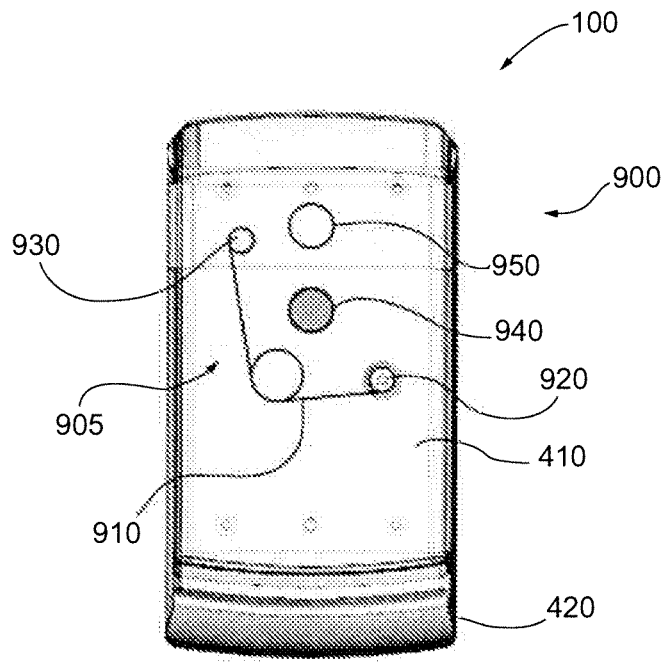
FIG. 9A to 9C illustrate an example embodiment of a locking/detent mechanism 900.
Figure 9B:
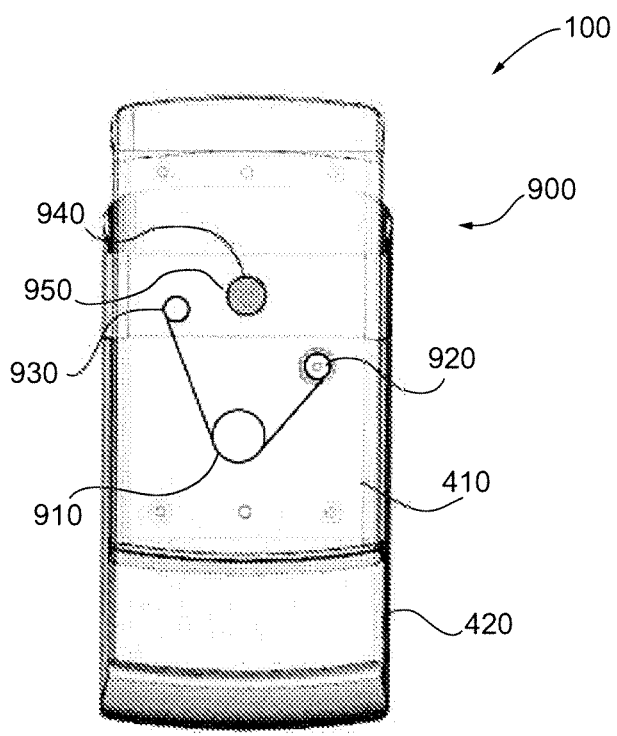
Figure 9C:
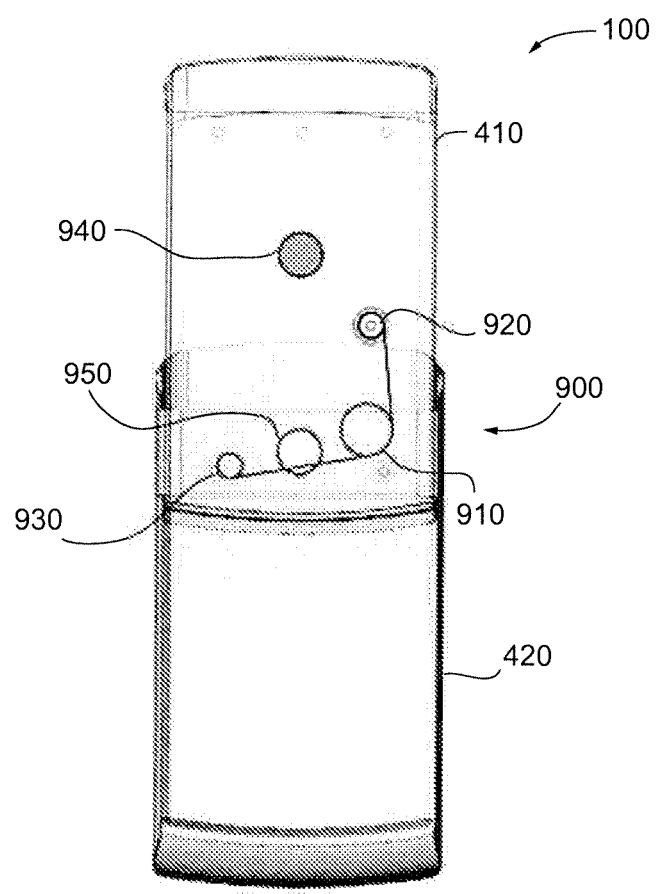

FIG. 9A to 9C illustrate an example embodiment of a locking/detent mechanism 900. A spring system 905 includes a spring 910 that is connected to an upper attachment 920 on the first portion 410 and to a lower attachment 930 on the second portion 420 of the mobile device 100. An upper magnet 940 is provided on the first portion 410 and a lower magnet 950 is provided on the second portion 420 of the mobile device 100. FIG. 9A shows the mobile device 100 in a closed position. The spring system 905 is configured such that the first portion 410 will be stable in the open or closed position relative to the second portion 420. As force is applied from the closed position, the first portion 410 will move to the first mode position as shown in FIG. 9B and provide access to the first user input area 430 of FIG. 4B. In this first mode position, the upper magnet 940 and lower magnet 950 are positioned/ engaged to provide an intermediate lock/detent mechanism of the first portion 410 relative to the second portion 420. The centering force of the magnets 940 and 950 overcomes any force to close or open the first portion 410 due to the spring system 905 so that the first portion 410 stays stable at that first mode position. With a further application of force, the user can move the first portion 410 out of the first mode position and the spring system 905 drives the first portion 410 to either the open or closed position (i.e. a second mode position) based on the direction that the user applies the force.

It will be understood that the spring system 905 used to provide a force driving the first portion and second portion open or closed may take other formats than that illustrated. For example, the spring system 905 may alternatively be a spring-loaded piston-type arrangement that is connected between fixed pivot points.

Figure 10A:
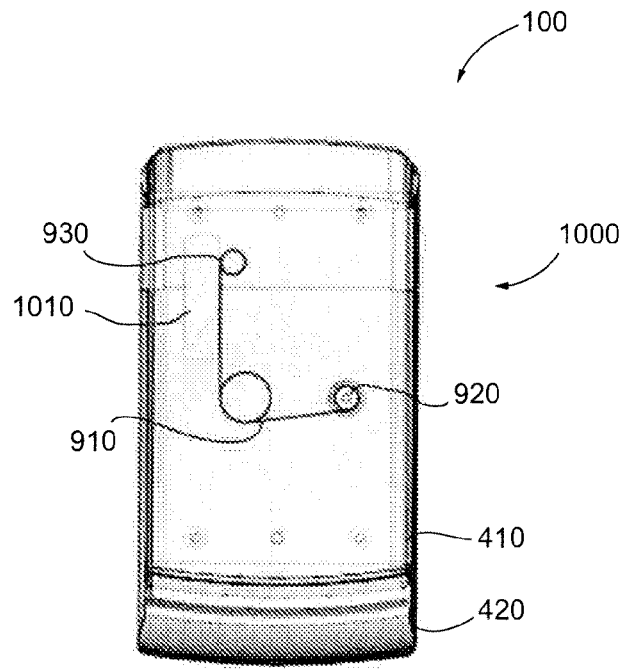
FIG. 10A to 10C illustrate another embodiment of a locking/detent mechanism 1000.
Figure 10B:
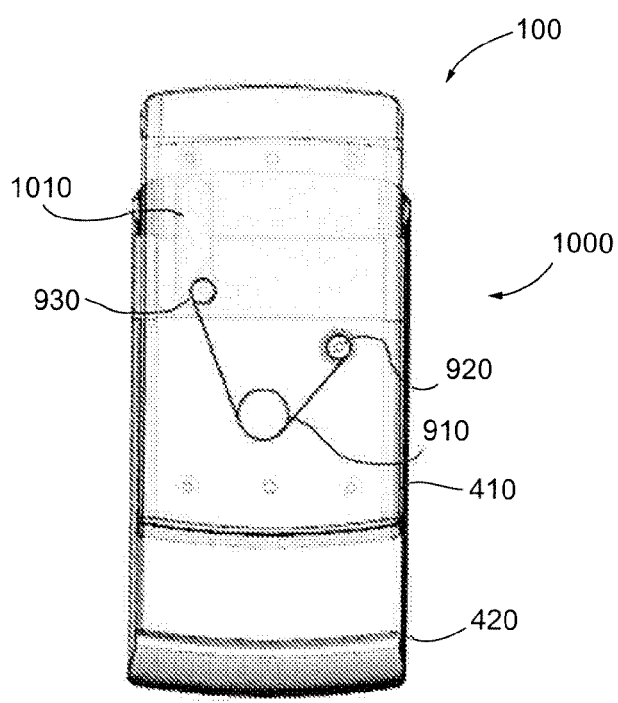
Figure 10C:
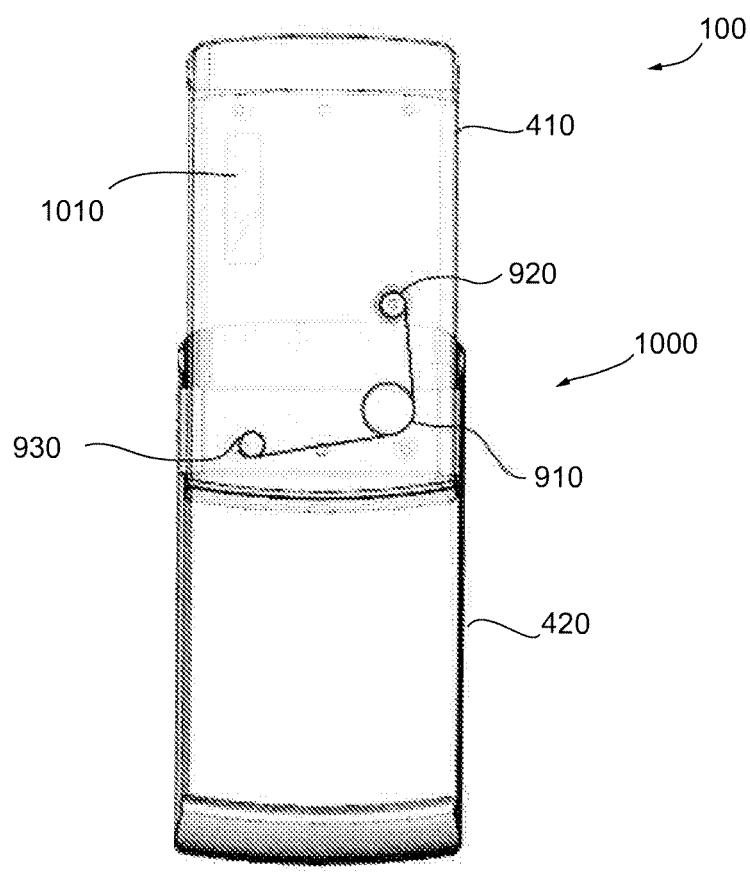

FIG. 10A to 10C illustrate another embodiment of a locking/detent mechanism 1000. This embodiment is similar to the embodiment shown in FIG. 9A to 9C, however, rather than using magnets 940/950 to lock/detent the first portion 410 relative to the second portion 420 at the first mode position, the first portion 410 is provided with a cam 1010 that engages with the lower attachment 930 of the spring 910 to compress the spring 910 at the first mode position and lock/detent the movement of the first portion 410 as shown in FIG. 10B. Similar to the locking/detent mechanism of FIG. 9A to 9C, the locking/detent mechanism 1000 uses an over-centering spring 910, but in this case the cam 1010 and moving lower attachment 930 are used to create the stable position in the first mode position. In the first mode position, the spring 910 is compressed (in torsion it wants to spread out to a larger angle) but the spring 910 is positioned against the cam 1010 where the angle holds the spring 910 stable and doesn't drive the first portion 410 closed. If the first portion 410 is pushed further open, the spring 910 operates like the spring of FIG. 9A to 9C, while if the first portion 410 is pushed closed the user must provide the extra force to climb the cam 1010 and then the spring 910 can drive the first portion 410 closed over the flat portion of the profile of the cam 1010.

Figure 11A:
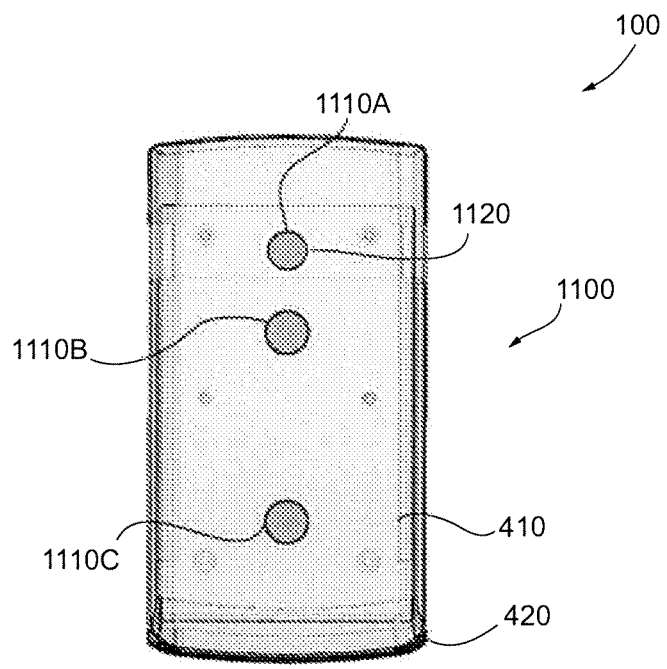
FIG. 11A to 11C illustrate another embodiment of a locking/detent mechanism 1100 that makes use of magnets for each of the mode positions.
Figure 11B:
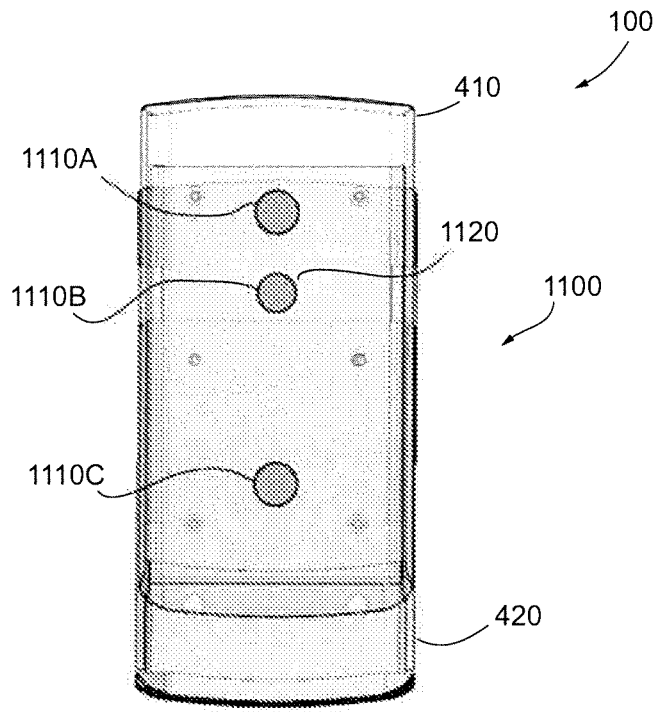
Figure 11C:
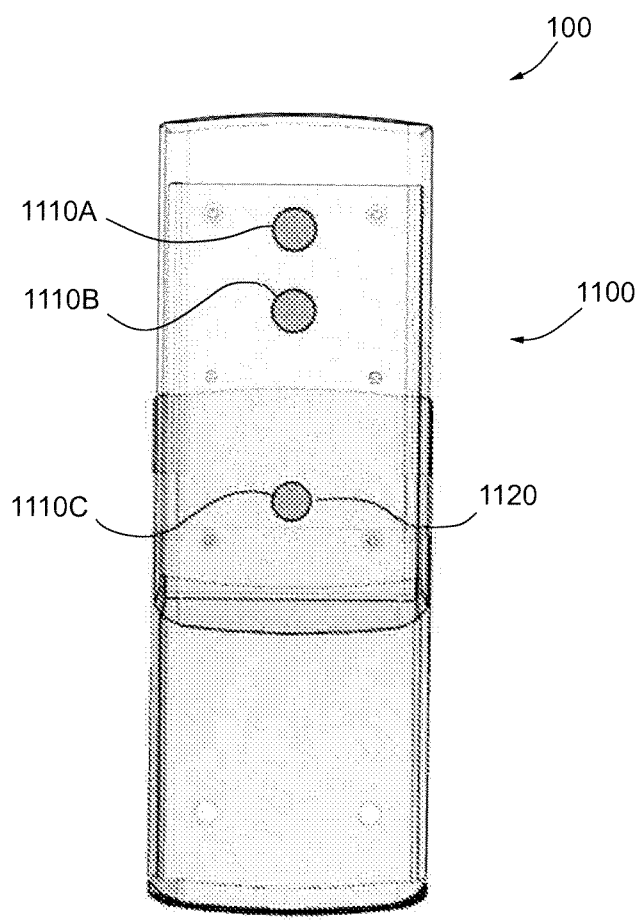

FIG. 11A to 11C illustrate another embodiment of a locking/detent mechanism 1100 that makes use of magnets for each of the mode positions. In this embodiment, the first portion 410 of the mobile device 100 includes three upper magnets 1110A to 1110C while the second portion 420 includes a lower magnet 1120. In FIG. 11A, the mobile device 100 is in a closed position and the first upper magnet 1110A is engaged with the lower magnet 1120. In FIG. 11B, the second upper magnet 1110B is engaged with the lower magnet 1120 and the first portion 410 is held in position relative to the second portion 420 at the first mode position. In FIG. 11C, the third upper magnet 1110C has been moved to engage with the lower magnet 1120 and, thus, hold the first portion 410 in the fully open position relative to the second portion 420. Although the terms upper and lower have been used in relation to the magnets, it will be understood that alternate terms could be used such as slide magnet and base magnet and the upper and lower arrangement could be reversed.

It will be understood that the magnets can be positioned in various configurations and sizes to achieve multiple stopping locations and force requirements for sliding. FIG. 11A to 11C shows three stopping positions but more positions may also be possible. The attraction between the lower (base) magnet and upper (slide) magnets, when aligned, generally designate these stopping positions. An external force is typically required to move from one position to another.

Figure 12:
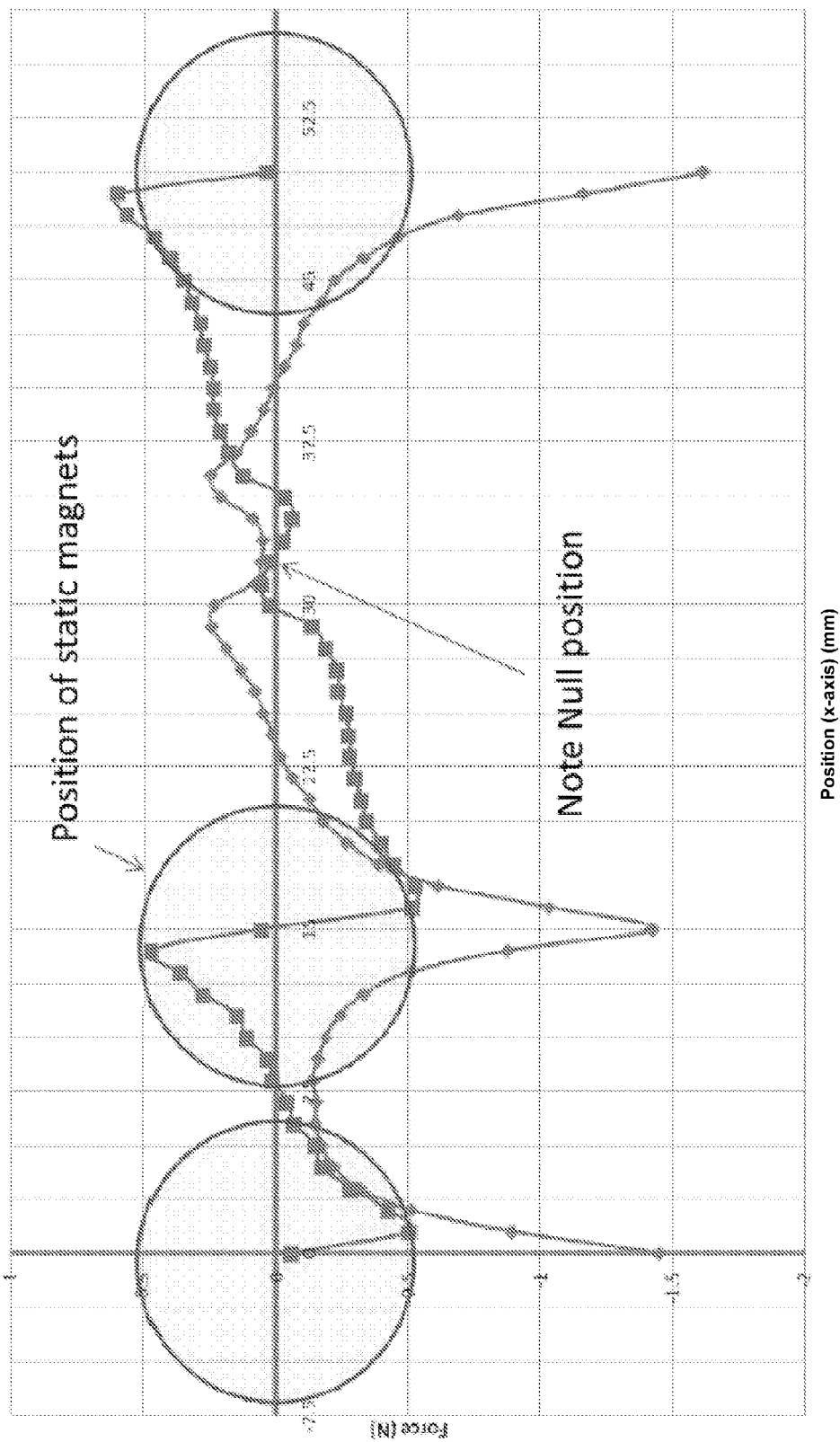
FIG. 12 shows a graph that illustrates axial and transverse forces in a magnet-based slide mechanism.

In configuring magnet locations, it can be important to be aware of non-magnetic zones in order to provide the best feel for the slide movement. FIG. 12 shows a graph that illustrates axial and transverse forces in a magnet-based slide mechanism and shows the occurrence of a non-magnetic, null position (sometimes referred to as a "dead zone") due to perimeters of magnetic field strength and center distances between slide magnet pairs. With any symmetrical system there will be a point of equilibrium where the attractive and repulsive forces between base magnet and a slide magnet pair balance. In this instance the base magnet will center naturally between the slide magnet pair until an additional force (for example, gravity if the mobile device is held vertically) biases the movement one way. FIG. 12 also illustrates that the intersection of the transverse forces with the x-axis generally indicates the boundary of a magnetic zone around a magnet while the portion of the axial forces above the x-axis represents a repulsive force, which in many configurations is preferably minimized.

In addition to dead zones, the configuration of magnets as a part of a slide mechanism (including a locking/detent mechanism) involves appropriately setting the amount of force needed to engage and disengage the magnets as they move in relation to each other. As such, in some cases, it may be useful for the lower magnet and upper magnet to have an unequal strength of magnetic field. In other embodiments it may be appropriate to use a steel fitting/plate or some magnetically active material in place of an appropriate one or more of the magnets (for example, the lower magnet that engages with the upper magnets). Other embodiments may involve the use of magnets with a steel surround, magnets with a steel covering, magnets with a broken steel cover or the like. Embodiments involving at least some of these configurations will be further described below.

As noted above, a force must generally be applied in order to move among the stopping positions. However, in some embodiments, which will be described in further detail below, the magnets may also assist with the movement of the first portion 410 (sometimes referred to as the slide portion 410) in relation to the second portion 420 (sometimes referred to as the base portion 420). In the following embodiments, a user will push on the slide portion 410 to begin the movement from one position to another and the slide mechanism, including the magnets, will be configured (for example, positioned and selected) in order to create an assist so that the user does not need to apply the same force over the entire distance of travel. Once a user begins to slide the slide portion 410 in relation to the base portion 420, a slide magnet (originally aligned with a base magnet) leaves the base magnet's magnetic field, and at a predetermined point the base magnet will enter the magnetic field of the next slide magnet and the attraction will reduce the force needed or, in some cases, may cause the slide portion 410 to move on its own. In this situation, if appropriately configured, the magnets assist the user when moving the slide portion 410 from one stop location to another. This is a semi-automatic type of slide mechanism in which the user will push the slide portion 410 to begin the motion and the slide mechanism will take over and complete the moving action and stopping action automatically.

Figure 13:
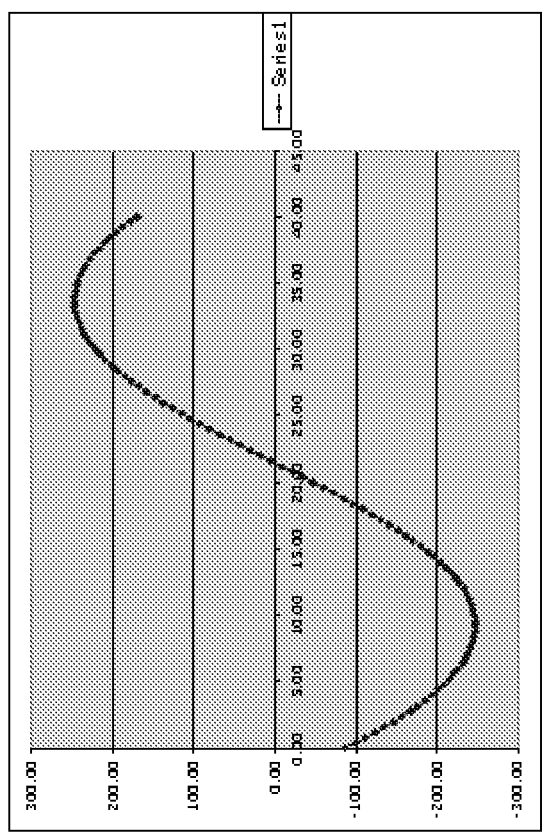
FIG. 13 shows a typical force profile for a mechanical-based slide mechanism.

It is believed that the experience of a user moving a magnetically assisted slide mechanism will feel different than the experience of moving a mechanically assisted mechanism and can also be configured to provide different "feels" (related to the force profile required to move the slide mechanism) depending on the design of the mobile device. To illustrate the differences in forces required by a user, i.e. the "feel" of the slide, FIG. 13 shows a typical force profile for a mechanical-based slide mechanism while graphs described below show force profiles for various magnetic configurations.

FIGS. 14-26 illustrate various potential magnetic configurations and their force profiles for slides having a plurality of stop locations or positions. In these examples, a plurality of slide magnets are attached to the slide portion and one or more base magnets are attached to the base portion. It will be understood that the placement of the magnets on the slide or base portions could be reversed depending on the particular mobile device or the intended design. Similarly, alternate magnet arrangements may be conceived that provide a similar functionality to that disclosed herein.

Figure 14:
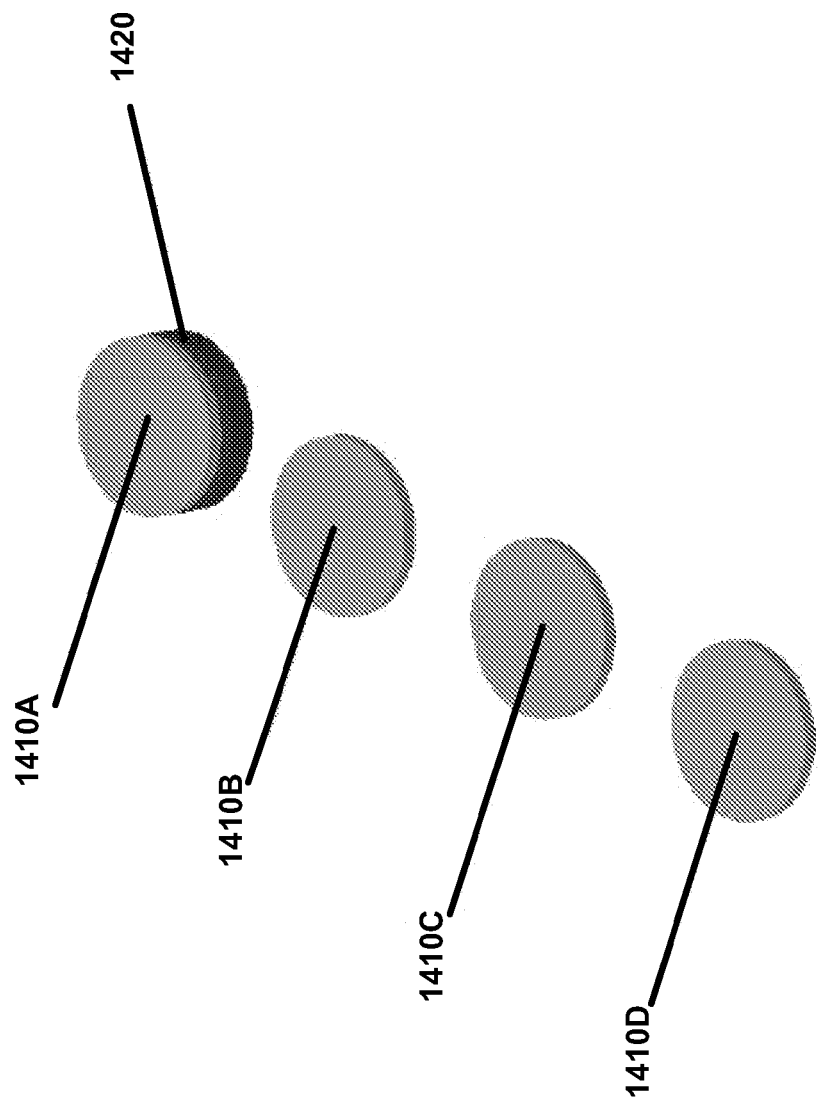
FIG. 14 illustrates an example magnetic configuration for a mobile device slide system having a plurality of stop locations.
Figure 15:
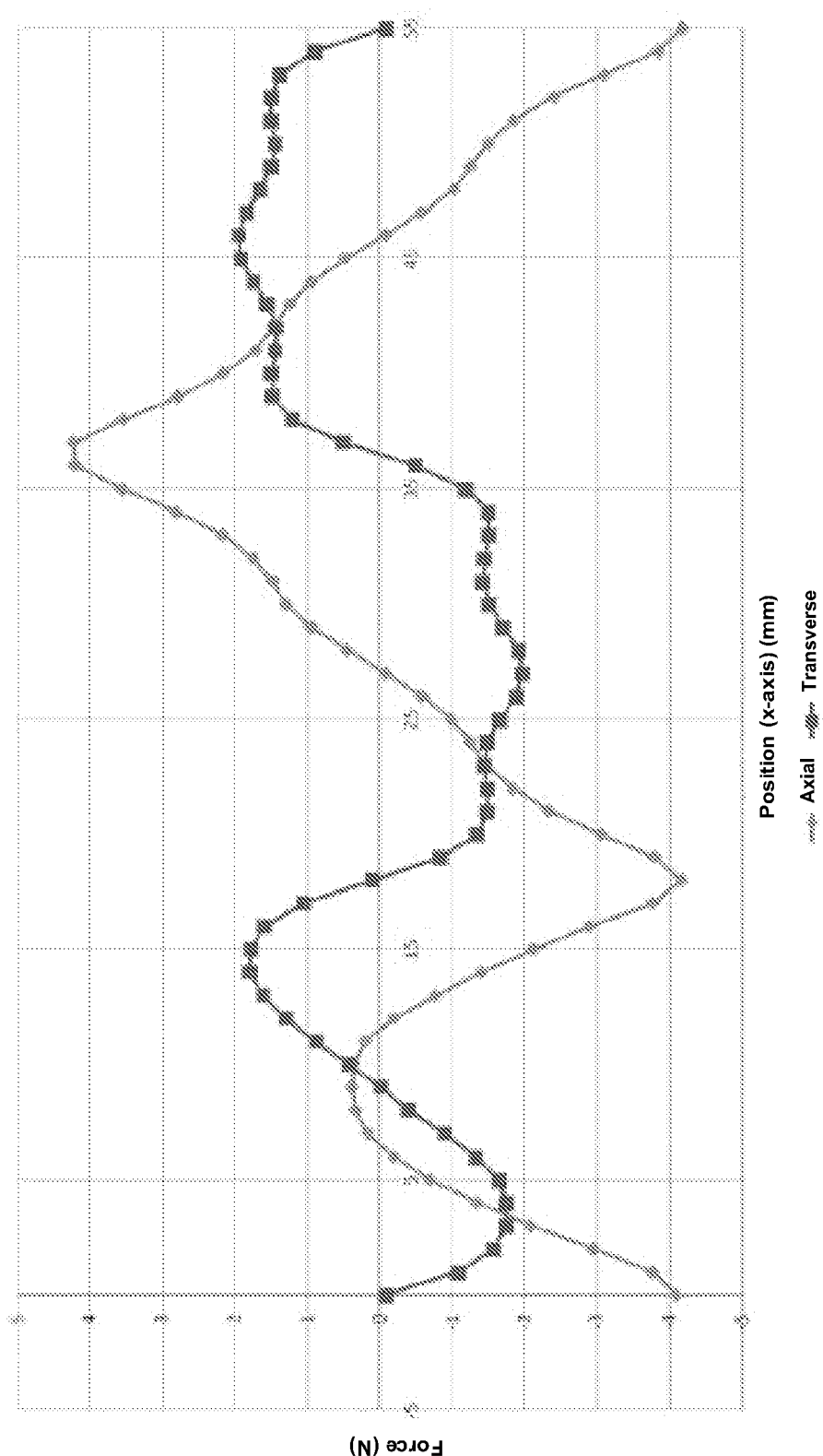
FIG. 15 shows a graph illustrating a force profile for the configuration of FIG. 14.

FIG. 14 shows an arrangement in which four slide magnets 1410A-D are positioned to slide over a single base magnet 1420. In this particular case, the third slide magnet 1410C is of opposite polarity and provides a repulsive effect to allow the slide portion to more easily travel over the distance between the second slide magnet 1410B and the fourth slide magnet 1410D. It will be understood that the intended stop positions are associated with the centers of slide magnets 1410A, 1410B and 1410D. In this configuration, the repulsive third slide magnet 1410C is intended to effectively fill in the "dead magnetic field zone" and provide a repulsion force to assist with driving the slide portion in either direction to the nearest position away from the third slide magnet 1410C itself. With a central repulsive magnet, the slide portion must be moved through the repulsive magnet before the slide portion will travel onwards to a different slide magnet, for example, from the second slide magnet 1410B, through the third slide magnet 1410C (repulsive) over its 'repulsive peak', where the third slide magnet 1410C will be repelled away the base magnet 1420 while the fourth slide magnet 1410D will be attracted to the base magnet 1420. Should the slide portion not travel through the third slide magnet 1410C repulsive peak (center of diameter), the slide portion will return to its previous position (the second slide magnet 1410B). As an example, the slide magnets may be 12 mm diameter and 1 mm thick while the base magnet may be 12 mm diameter and 2 mm thick. The magnetic air gap between the magnets when aligned may be configured at 1 mm. FIG. 15 shows a graph illustrating a force profile for this configuration and illustrates the effect of the repulsive third slide magnet 1410C. In this embodiment, the repulsive third slide magnet 1410C may be considered a magnetically active element that is in spatial relation to the other slide magnets and that alters the magnetic forces between the slide magnets 1410B and 1410D and the base magnet 1420.

Figure 16:
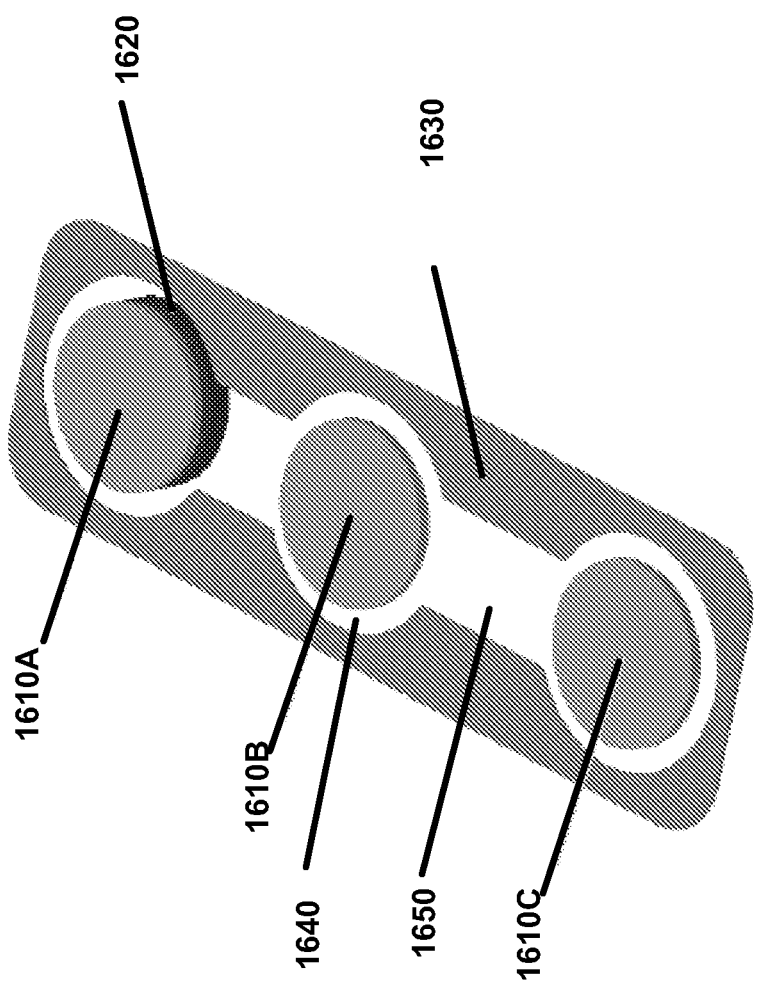
FIG. 16 illustrates another example magnetic configuration for a mobile device slide system having a plurality of stop locations.
Figure 17:
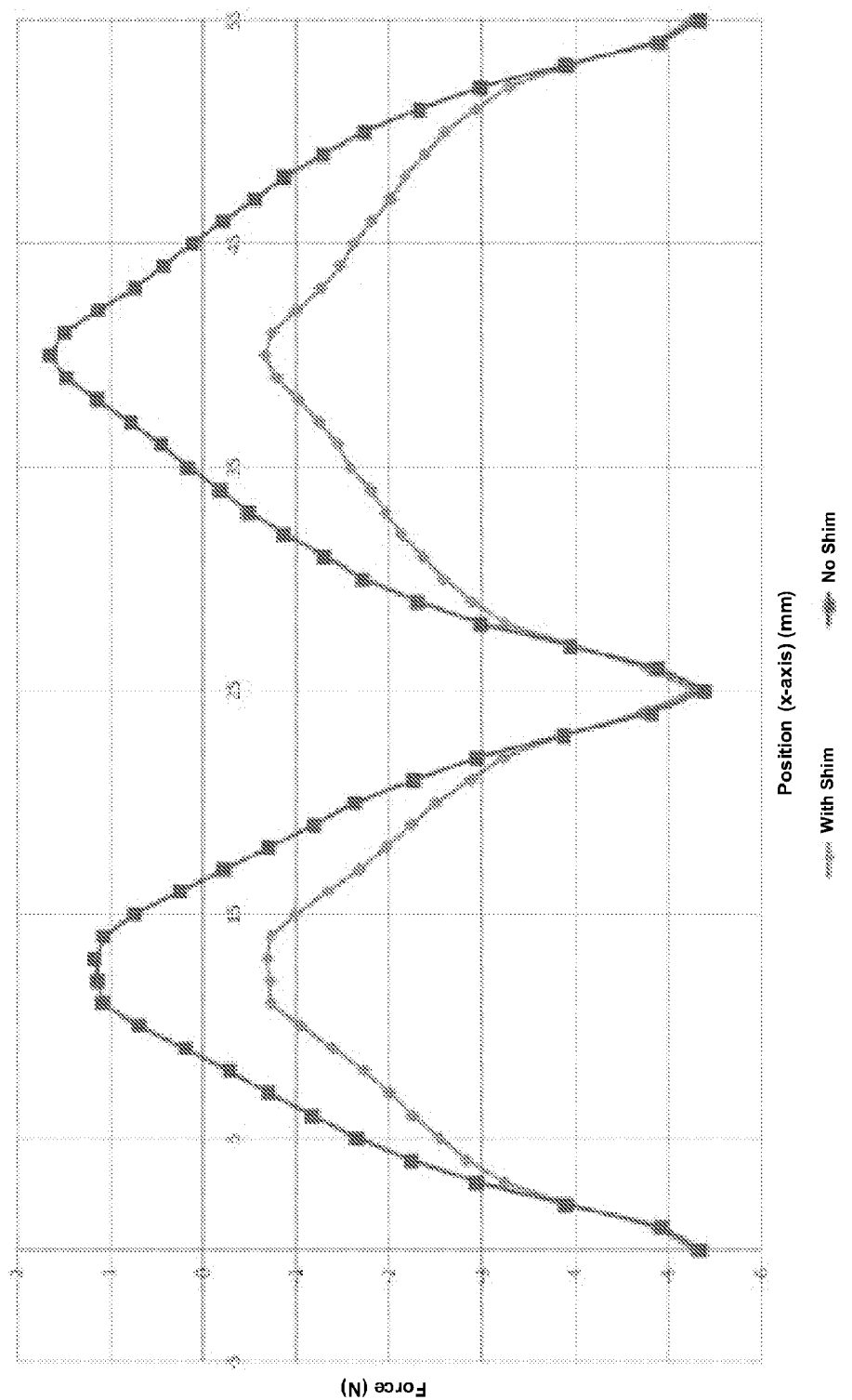
FIG. 17 shows a graph illustrating an axial force profile for the configuration of FIG. 16.
Figure 18:
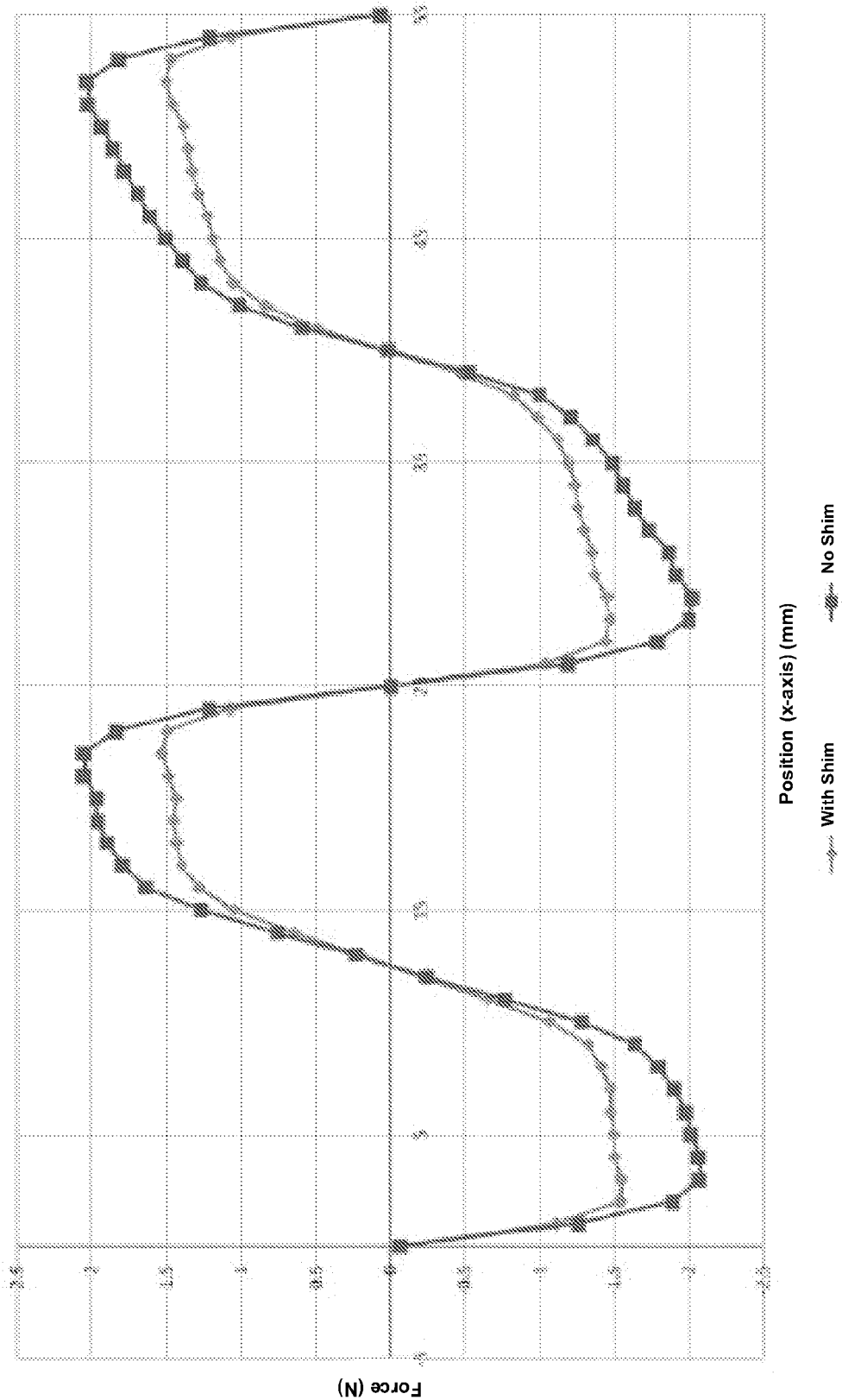
FIG. 18 shows a graph illustrating a transverse force profile for the configuration of FIG. 16.

FIG. 16 shows an arrangement in which there are three slide magnets 1610A-C and one base magnet 1620. The three slide magnets 1610A-C are provided with a magnetically active element, referred to here as a shim 1630, in order to adjust magnetic forces that could impact the effectiveness or feel of the sliding mechanism. The shim 1630 may be formed of an appropriate magnetically active material, such as ferromagnetic materials, of which mild steel is one example and is positioned in spatial relation to the slide magnets 1610A-C to affect or alter the magnetic forces between the slide magnets 1610A-C and the base magnet 1620. In this case, the shim 1630 is a steel sheet in the plane of the slide magnets 1610A-C. The slide magnets 1610A-C fit into cut-out portions 1640 of the shim 1630 such that the circumference of the slide magnets 1610A-C are generally surrounded by the shim 1630 in the plane of the slide magnets 1610A-C. In this case, the shim 1630 is also provided with rectangular cut-outs 1650 that connect the cut-out portions 1640 which surround the slide magnets 1610A-C. The slide magnets 1610A-C and shim 1630 are positioned to slide over the single base magnet 1620. In a particular case, the slide magnets may be 15 mm diameter and 1 mm thick while the base magnet is 15 mm diameter and 2 mm thick. The shim is a sheet of 0.3 mm mild steel with holes provided for the slide magnets. The magnetic air gap between the magnets when aligned is configured at 1 mm. FIGS. 17 and 18 show graphs illustrating force profiles for this configuration. FIGS. 17 and 18 illustrate the impact of using the shim 1630. It will be understood that the shim 1630 does not need to be a single sheet but could be a plurality of sheets or could have alternate configurations and still achieve the same or similar functionality to that shown in FIGS. 17 and 18 and generally described herein.

The shim 1630 is believed to impact the magnetic forces between the slide magnets 1610A-C and the base magnet 1620 by reducing repulsive forces and increasing attractive forces. For example, when an axially polarized magnet passes over a stationary axially polarized magnet, their natural interaction produces a repulsive force. In a magnetic slide mechanism without shim, it is possible to feel this repulsive force interaction (either physical separation between sliding and stationary portions in Y direction or in the change in force required to displace the slide magnet (that is, a larger initial force is needed to displace a slide magnet from a base magnet, wherein the force required reduces as the slide magnet moves further away from the base magnet and attraction decreases but then an increased force is required to overcome the repulsive interaction)). It is believed that the shim provides an additional attraction force to counteract the repulsive forces that naturally occur when axially polarized magnets slide over one another linearly. As such, it is suggested that with an increase in the shim area coverage, there will be less repulsion and more attractive force in between the slide magnets.

Figure 19:
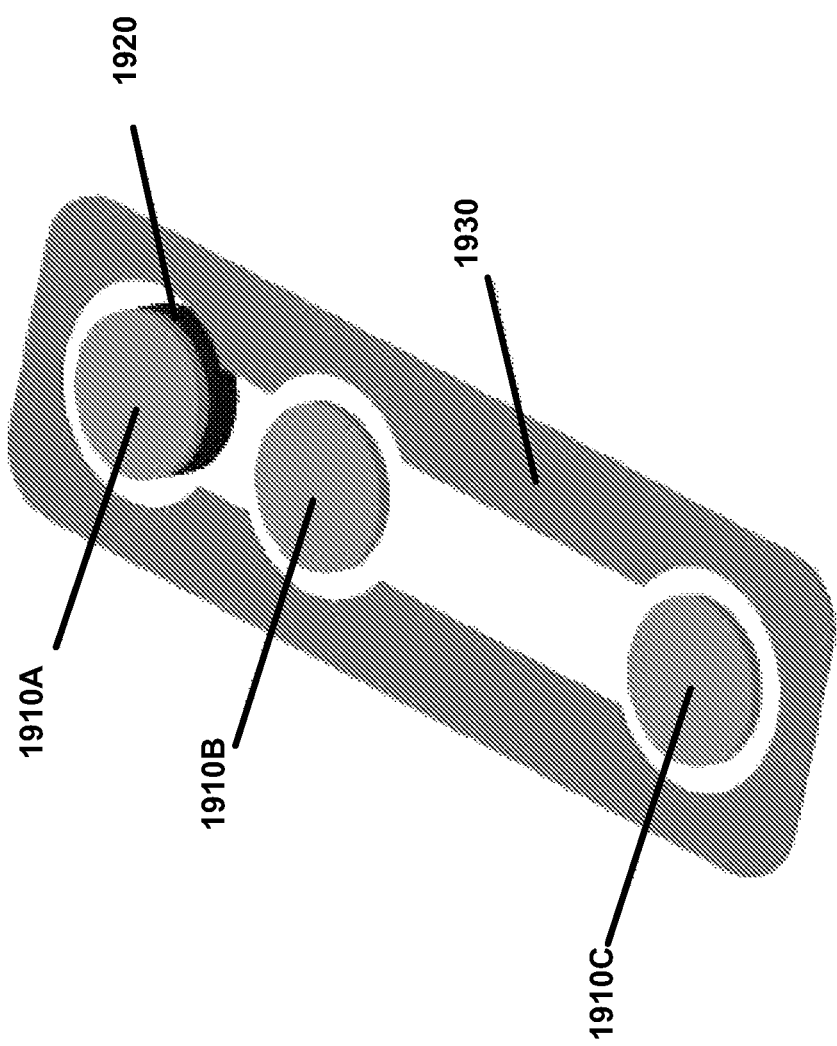
FIG. 19 illustrates another example magnetic configuration for a mobile device slide system having a plurality of stop locations.
Figure 20:
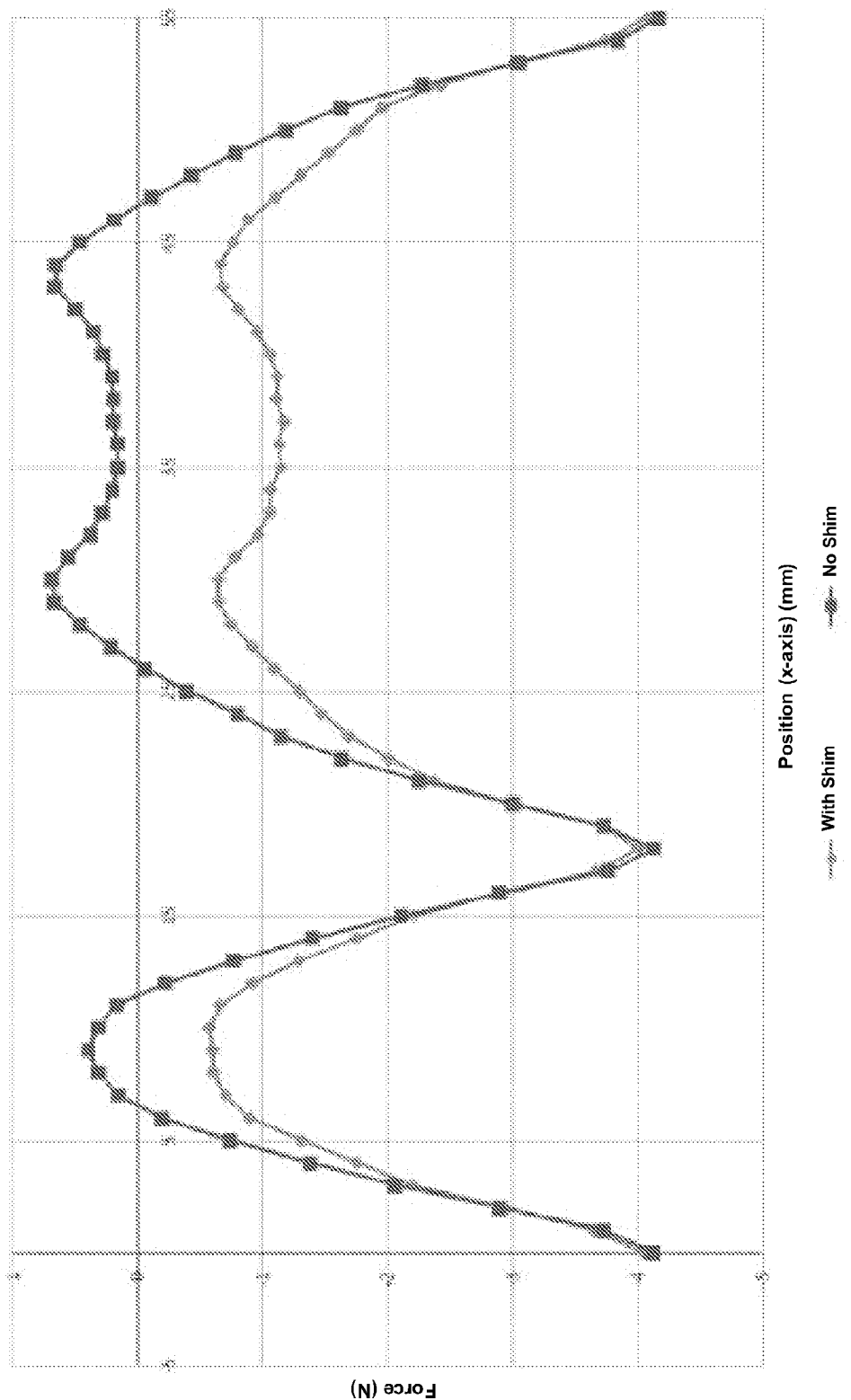
FIG. 20 shows a graph illustrating an axial force profile for the configuration of FIG. 19.
Figure 21:
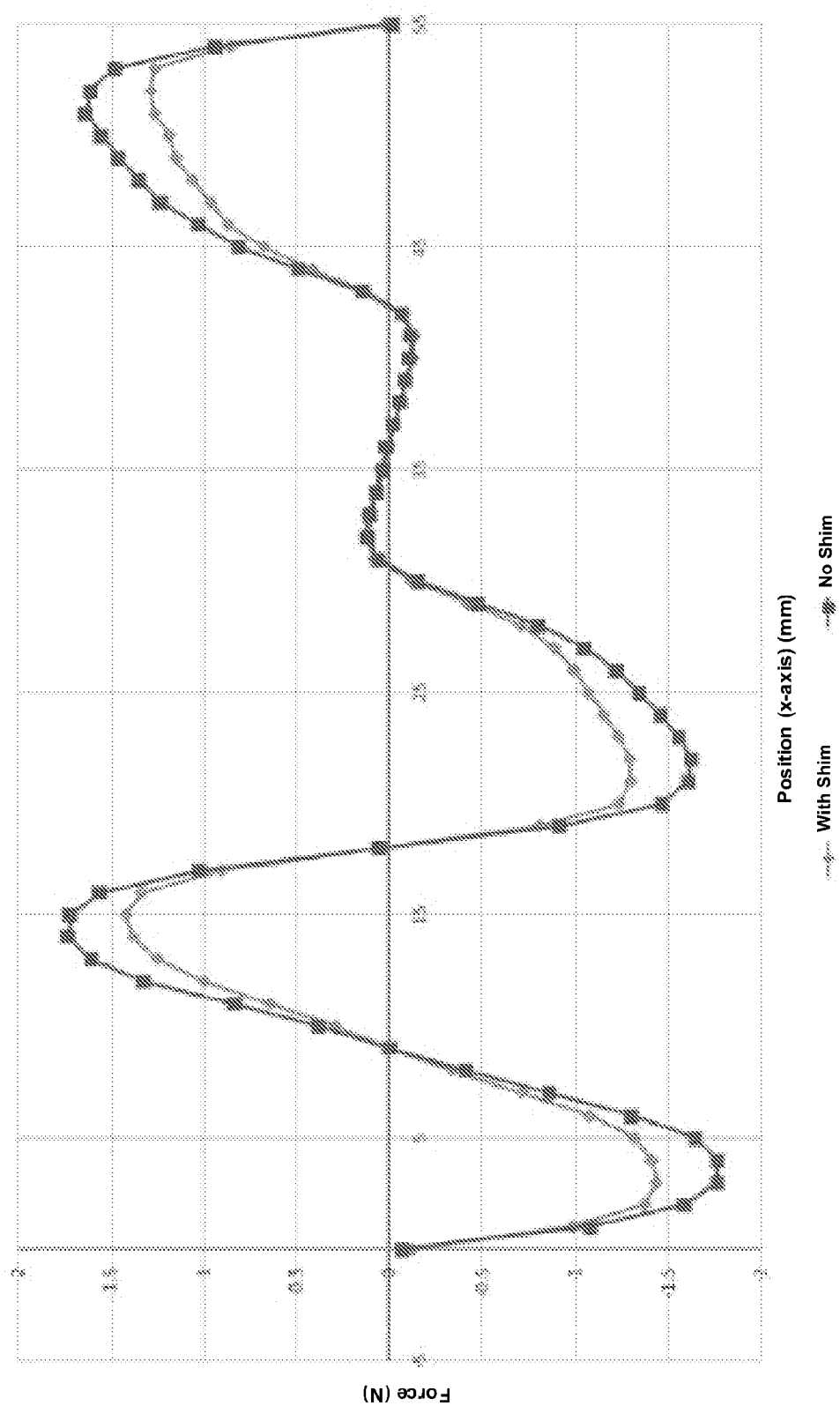
FIG. 21 shows a graph illustrating a transverse force profile for the configuration of FIG. 19.

FIG. 19 shows an arrangement that is similar to that of FIG. 16 with three slide magnets 1910A-C and one base magnet 1920 but having a larger gap between a second slide magnet 1910B and a third slide magnet 1910C. In this case, a shim 1930 is also used. FIGS. 20 and 21 show graphs illustrating force profiles for this configuration and the impact of the shim 1930.

Figure 22:
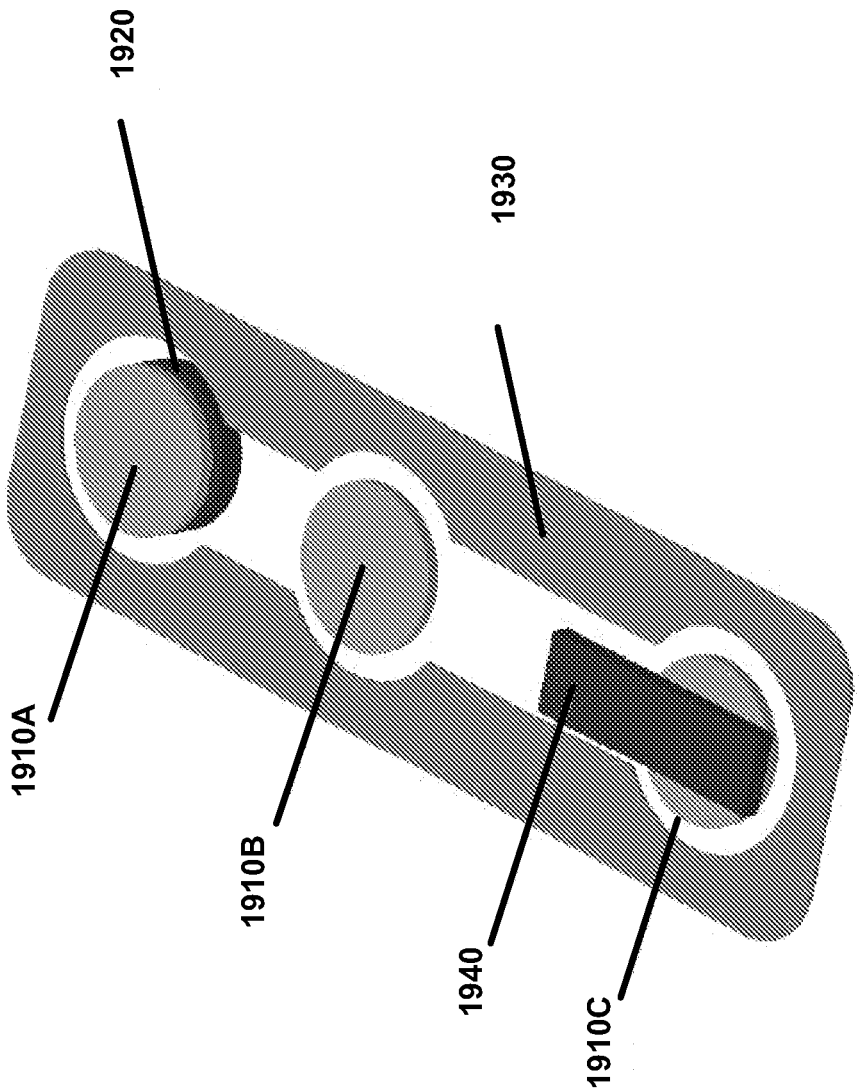
FIG. 22 illustrates another example magnetic configuration for a mobile device slide system having a plurality of stop locations.
Figure 23:
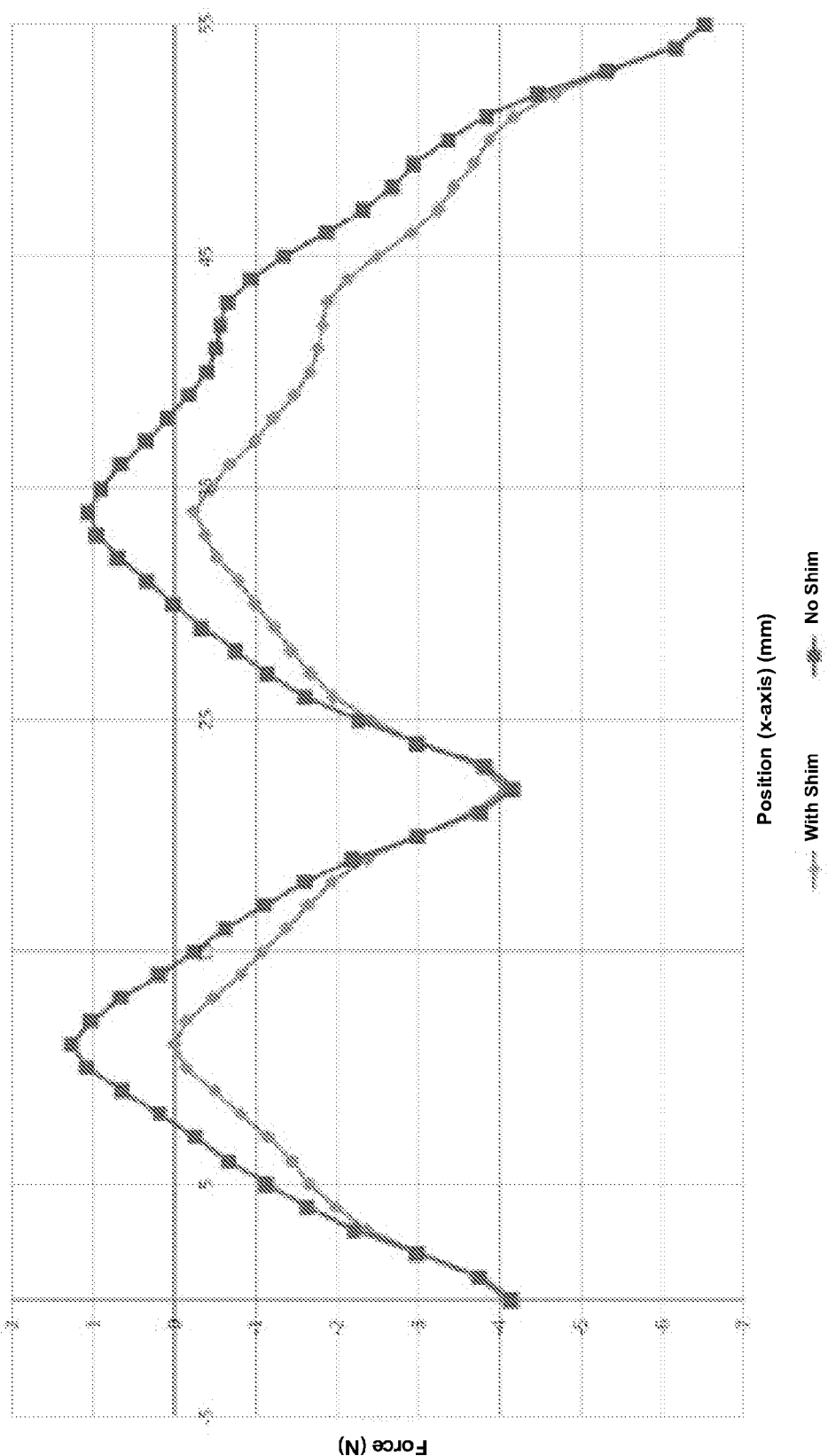
FIG. 23 shows a graph illustrating an axial force profile for the configuration of FIG. 22.
Figure 24:
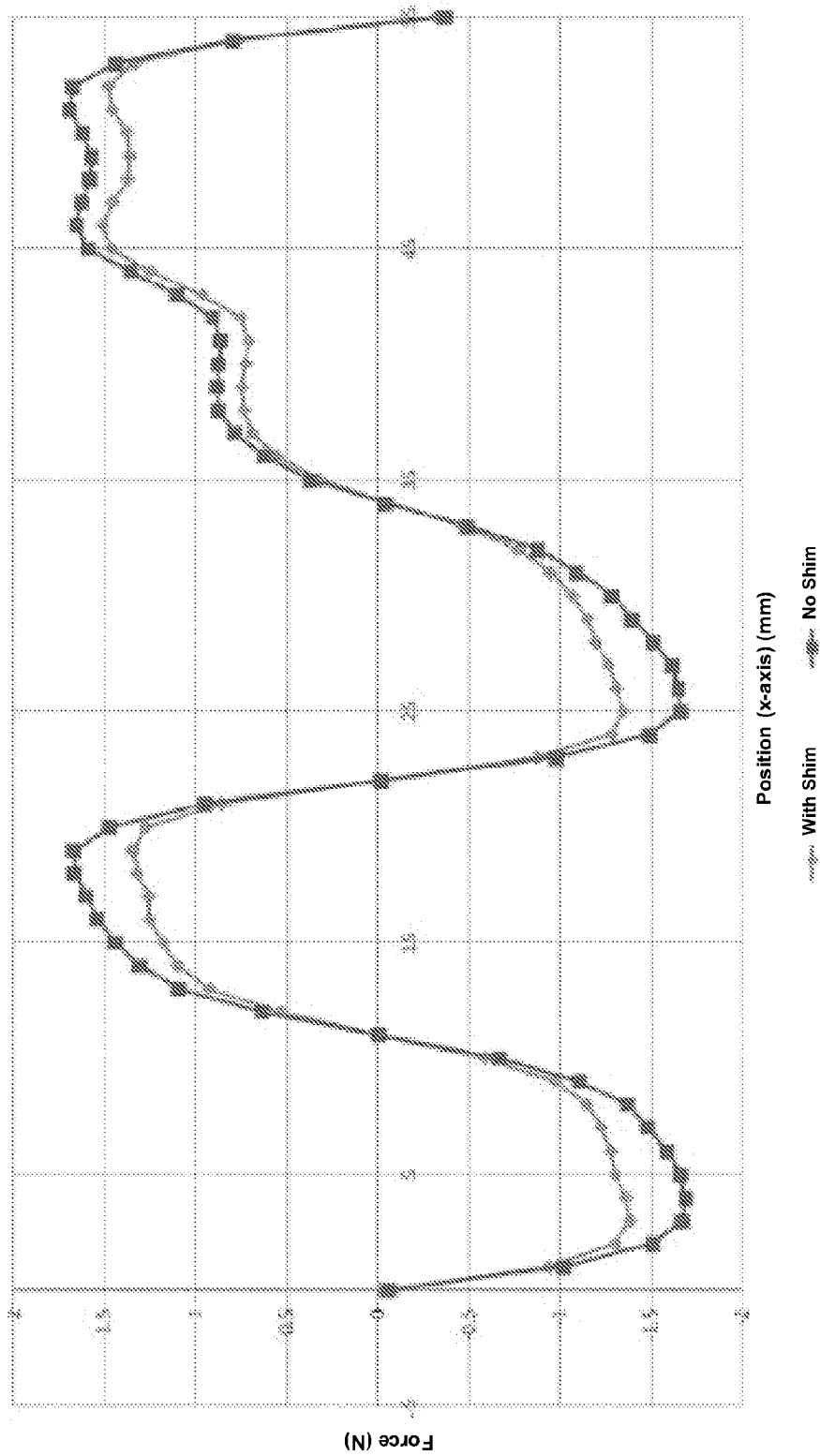
FIG. 24 shows a graph illustrating a transverse force profile for the configuration of FIG. 22.

FIG. 22 shows an arrangement that is similar to that of FIG. 19 but a bar magnet 1940 is provided on top of the third slide magnet 1910C and positioned such that the bar magnet 1940 extends past the third slide magnet 1910C in the direction of the second slide magnet 19108. This assists with the sliding of the slide portion 410 and base portion 420 in a situation where a length of the gap between two intended stop positions (slide magnets 1910) is slightly longer. FIGS. 23 and 24 show graphs illustrating force profiles for this configuration and illustrate the differences in the force profile and reduced non-magnetic zone caused by the bar magnet 1940.

Figure 25:
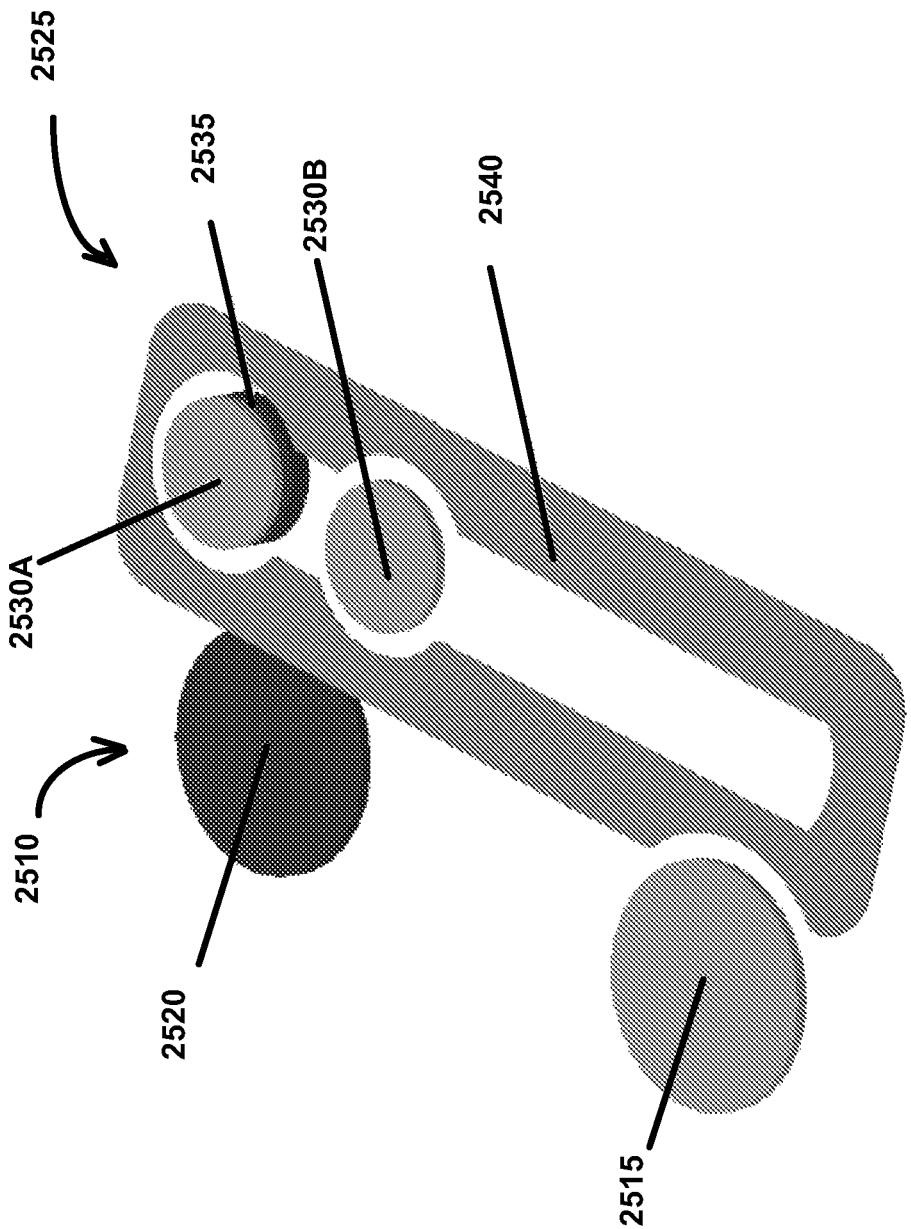
FIG. 25 illustrates another example magnetic configuration for a mobile device slide system having a plurality of stop locations.
Figure 26:
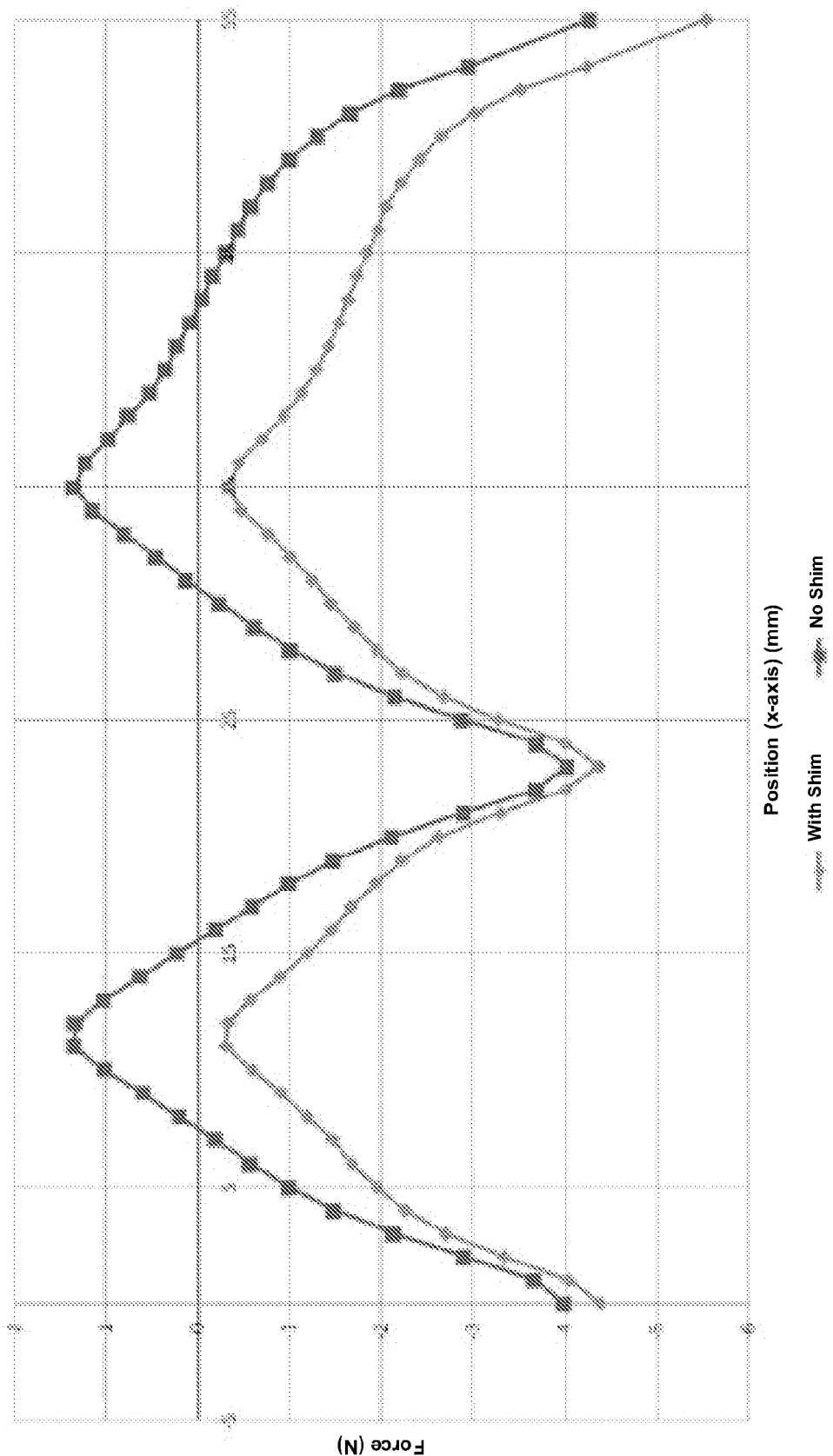
FIG. 26 shows a graph illustrating an axial force profile for the configuration of FIG. 25.
Figure 27:
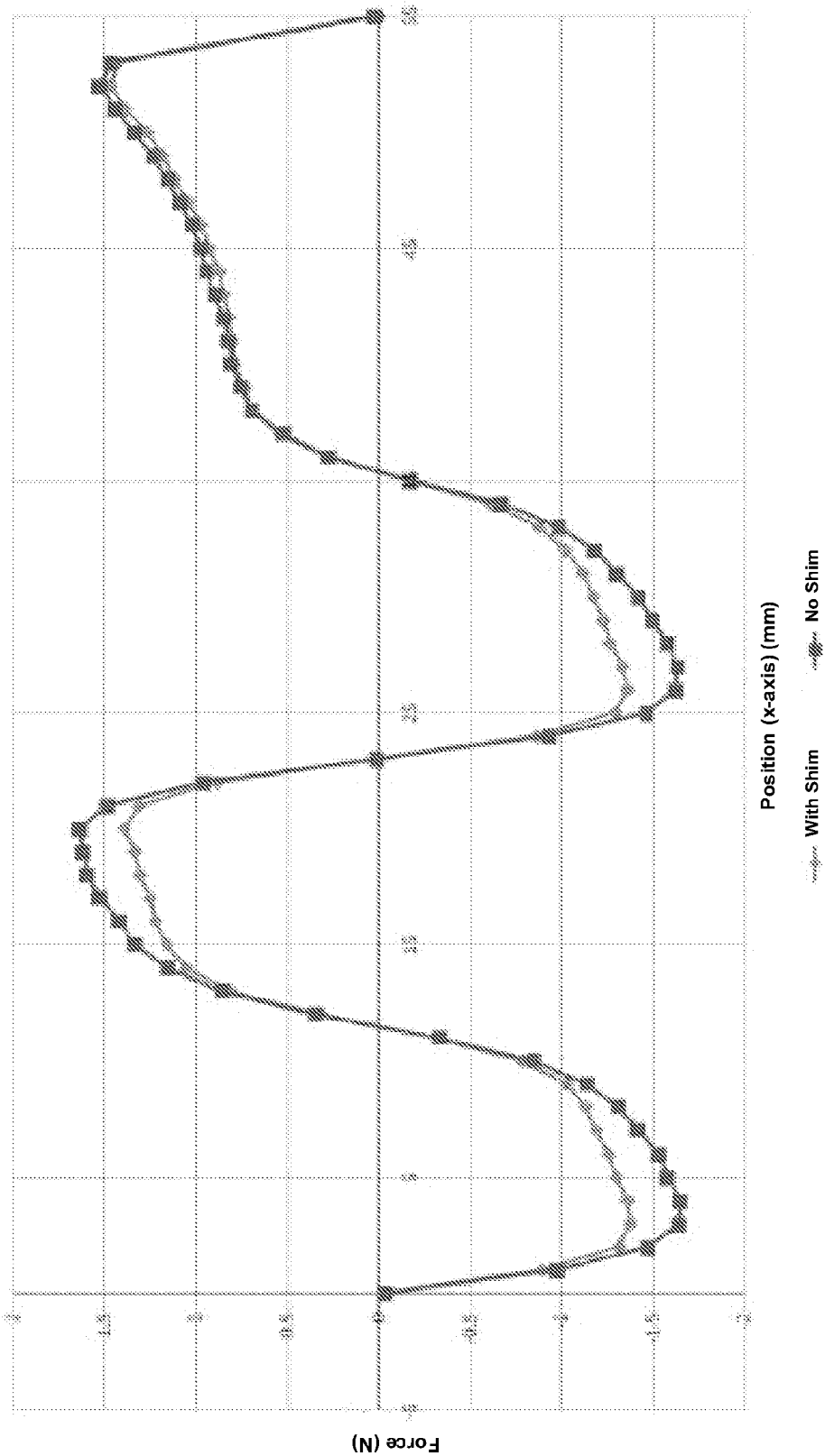
FIG. 27 shows a graph illustrating a transverse force profile for the configuration of FIG. 25.

FIG. 25 shows an arrangement in which a first set of magnets 2510 includes a large slide magnet 2515 positioned to slide over a large base magnet 2520. A second set of magnets 2525 includes first and second slide magnets 2530A and 2530B that are positioned to slide over a base magnet 2535. The sets of magnets are offset such that slide magnets from each set do not slide over base magnets of the other set. In this situation, when the mobile device 100 is closed the first slide magnet 2530A is positioned over the base magnet 2535. As the slide portion 410 is moved relative to the base portion 420, the second slide magnet 2530B moves over the base magnet 2535 to act as a first stop. Additional application of force, causes the large slide magnet 2515 to move over the large base magnet 2520 to provide a second stop. In this case, the first and second slide magnets 2530A-B are provided with a shim 2540 and, in a particular case, the shim 2540 may include a cut out area 2545 for the first and second slide magnets 2530A-B, similar to that in previous embodiments. In the case where the large slide magnet 2515 is in the same plane as the first and second slide magnets 2530A-B, the shim 2540 may also include a cut-out 2550 to allow room for the large slide magnet 2515. In a particular case, the first set of magnets 2510 may be 20 mm diameter and 1 mm thick while the second set of magnets 2525 may be 12 mm diameter with the first and second slide magnets 2530A-B being 1 mm thick and the base magnet 2535 being 2 mm thick. The shim is 0.3 mm mild steel and the magnetic air gap between the magnets when aligned is configured at 1 mm. FIGS. 26 and 27 show graphs illustrating force profiles for this configuration. As shown in FIGS. 25, 26, and 27, the attraction distance (i.e. distance required for the slide portion 410 to move) can be compensated for by adjusting the diameter of the magnets to provide larger diameters for longer distances.

In the embodiments of FIGS. 14-27, the intention is that the magnets will assist slide portion 410 movement in such a way that the user begins movement and the attraction and/or repulsion of the magnets assists or, in some cases, causes the slide portion 410 to move automatically to and stop at the next stop location.

In particular, the configuration/placement of the magnets is intended to maximize the effect of the magnetic fields and reduce the repelling effect at the perimeters of the discs. The configuration/placement of the magnets is also intended to minimize dead zones (areas where the slide may not be subject to appropriate magnetic forces in between intended stops). As noted above, in some cases, a shim can be used to assist with magnetic forces, and in particular axial magnetic repelling forces, to allow the slide portion 410 to move more easily or have a different feel. In other cases, adding a slide magnet having an opposite polarity or a bar magnet can also assist with magnetic forces and adjust the feel of the slide portion 410 movement. The configuration/placement of the magnets can be adjusted in various configurations in order to adjust axial repulsive forces and non-magnetic zones to achieve slightly different feels for the user, for example, depending on a target market for the particular mobile device or the like. Various factors can be used in creating configurations. For example, some rules of thumb include:

axial and transverse attraction/repulsion forces are typically dependent on magnet diameter, thickness and distances between consecutive slide magnets;

if there is no field interaction, the magnetic zone is approximately equal to the magnet diameter;

increasing base magnet thickness generally increases transverse attractive forces but does not typically effect transverse repulsion forces;

increasing air gap generally reduces axial and transverse attraction/repulsion forces;

to provide positive centering of magnets, diameters should generally be equal between slide magnet and base magnet.

It will be understood that other embodiments will be apparent to those skilled in the art based on the disclosure of the above embodiments. For example, it will be apparent that the present disclosure is not intended to be limited to only a dual mode user input mechanism, but could be expanded to three mode, four mode or more depending on the needs of the particular mobile device.

It should be understood that various other modifications can be made to the exemplary embodiments described and illustrated herein, without departing from the general scope of the appended claims. In particular, it should be understood that while the embodiments have been described for mobile communication devices, the embodiments are generally applicable to devices requiring user input in one or more modes.

We claim:

1. A slide system of a mobile device, the mobile device comprising a base portion and a slide portion configured to slide in relation to the base portion, the system comprising:
   at least one base magnet provided to the base portion;
   a plurality of slide magnets provided to the slide portion and configured such that the plurality of slide magnets are aligned to the at least one base magnet at predetermined positions during movement of the slide portion relative to the base portion; and
   a magnetically active element provided to the slide portion in spatial relation to at least one of the plurality of slide magnets such that magnetic forces between the at least one of the plurality of slide magnets and the at least one base magnet are affected.

2. A system according to claim 1, wherein the base magnet is replaced by a steel plate.

3. A system according to claim 1, wherein at least one of the magnets comprise a magnet having a steel surround.

4. A system according to claim 1, wherein at least one of the magnets comprise a magnet having a steel cover.

5. A system according to claim 1, wherein the magnetically active element is a steel sheet in a plane of the slide magnets, the steel sheet provided with cut-out portions configured to receive the slide magnets.

6. A system according to claim 5, wherein the steel sheet is also provided with oblong cut-out portions connecting the cut-out portions for the slide magnets.

7. A system according to claim 1, wherein the magnetically active element comprises at least one of the plurality of slide magnets having a reversed polarity in comparison to others of the plurality of slide magnets.

8. A system according to claim 1, further comprising:
   a rail provided in the base portion; and
   a bridge element provided between the base portion and the slide portion that supports the slide portion and is engaged with the rail to allow sliding movement of the bridge element along the rail.

9. A system according to claim 1, further comprising:
   a rail provided in the base portion; and
   an engagement portion provided to the slide portion that engages with the rail to allow sliding movement of the slide portion along the rail.

10. A slide system of a mobile device, the mobile device comprising a base portion and a slide portion configured to slide in relation to the base portion, the system comprising:
    at least one base magnet provided to the base portion;
    a plurality of slide magnets provided to the slide portion configured such that the plurality of slide magnets are aligned to the at least one base magnet at predetermined positions during movement of the slide portion relative to the base portion and wherein at least some of the plurality of slide magnets are associated with stop locations for the slide portion in relation to the base portion; and
    wherein at least one of the plurality of slide magnets has a reversed polarity in comparison to others of the plurality of slide magnets and is positioned in order to bridge a non-magnetic zone between the slide magnets associated with the stop locations.

11. A system according to claim 10, further comprising:
    a magnetically active element provided to the slide portion in spatial relation to at least one of the plurality of slide magnets such that magnetic forces between the at least one of the plurality of slide magnets and the at least one base magnet are affected.

12. A system according to claim 11, wherein the magnetically active element is a steel sheet in a plane of the slide magnets, the steel sheet provided with cut-out portions configured for receiving the slide magnets.

13. A system according to claim 12, wherein the steel sheet is also provided with oblong cut-out portions connecting the cut-out portions for the slide magnets.

14. A slide method for a mobile device comprising:
    when the mobile device is in a closed position, applying a force to a slide portion of the mobile device in relation to a base portion of the mobile device to open the mobile device;
    providing a detent mechanism configured to allow the slide portion to be held at a first mode position in which a first user input area is available, wherein the detent mechanism comprises:
       at least one base magnet provided to the base portion;
       a plurality of slide magnets provided to the slide portion and configured such that the plurality of slide magnets are aligned to the at least one base magnet at predetermined positions during movement of the slide portion relative to the base portion; and a magnetically active element provided to the slide portion in spatial relation to at least one of the plurality of slide magnets such that magnetic forces between the at least one of the plurality of slide magnets and the at least one base magnet are affected, and from the first mode position, applying a further force to move the slide portion to a second mode position in which a second user input area is available.

15. A method according to claim 14, further comprising changing a function of the first user input area when moving from the first mode position to the second mode position.

16. A method according to claim 15, wherein the changing the function of the first user input area comprises changing a function of at least one input control within the first user input area.

17. A method according to claim 14, wherein the magnetically active element is a steel sheet in a plane of the slide magnets, the steel sheet provided with cut-out portions configured to receive the slide magnets.

18. A method according to claim 17, wherein the steel sheet is also provided with oblong cut-out portions connecting the cut-out portions for the slide magnets.

19. A method according to claim 14, wherein at least one of the plurality of slide magnets has a reversed polarity in comparison to others of the plurality of slide magnets and is positioned in a non-magnetic zone.

20. A mobile device comprising:
a base portion comprising at least one base magnetic element; and
a slide portion mounted to the base and slideable in relation to the base portion between a closed position and an open position, the slide portion comprising:
a plurality of slide magnets disposed such that the plurality of slide magnets are aligned to the at least one base magnetic element at predetermined positions during movement of the slide portion relative to the base portion; and
a slide magnetically active element disposed in spatial relation to at least one of the plurality of slide magnets such that magnetic forces between the at least one of the plurality of slide magnets and the at least one base magnetic element are affected.

21. A mobile device according to claim 20 wherein the plurality of slide magnets comprises a first magnet disposed to align with the base magnetic element in the closed position, and a second magnet disposed to align with the base magnetic element in the open position.

22. A mobile device according to claim 21 wherein the plurality of slide magnets further comprises at least one intermediate magnet disposed to align with the base magnetic element at an intermediate position between the closed position and the open position.

23. A mobile device according to claim 20, wherein the base magnetic element is a magnet.

24. A mobile device according to claim 20, wherein the base magnetic element is a steel plate.

25. A mobile device according to claim 20, wherein at least one of the base magnetic element or the slide magnets comprise a magnet having a steel surround.

26. A mobile device according to claim 20, wherein at least one of the base magnetic element or the slide magnets comprise a magnet having a steel cover.

27. A mobile device according to claim 20, wherein the slide magnetically active element is a steel sheet defining cut-out portions, and wherein the slide magnets are received in the cut-our portions.

28. A mobile device according to claim 27, wherein the steel sheet is provided with oblong cut-out portions connecting the cut-out portions for the slide magnets.

29. A mobile device according to claim 20, wherein the slide magnetically active element comprises at least one of the plurality of slide magnets having a reversed polarity in comparison to others of the plurality of slide magnets.

30. A mobile device according to claim 20, further comprising:
a rail provided in the base portion; and
a bridge element provided between the base portion and the slide portion that supports the slide portion and is engaged with the rail to allow sliding movement of the bridge element along the rail.

31. A mobile device according to claim 20, further comprising:
a rail provided in the base portion; and
an engagement portion provided to the slide portion that engages with the rail to allow sliding movement of the slide portion along the rail.

32. A mobile device comprising:
a base portion comprising at least one base magnetic element; and
a slide portion mounted to the base portion and slideable between a closed position and an open position, the slide portion comprising:
a plurality of slide magnets configured such that the plurality of slide magnets are aligned to the at least one base magnetic element at predetermined positions during movement of the slide portion relative to the base portion and wherein at least some of the plurality of slide magnets are associated with stop locations for the slide portion in relation to the base portion; and
wherein at least one of the plurality of slide magnets has a reversed polarity in comparison to others of the plurality of slide magnets and is positioned in order to bridge a non-magnetic zone between slide magnets associated with the stop locations.

33. A mobile device according to claim 32 wherein the plurality of slide magnets comprises a first magnet disposed to align with the base magnetic element in the closed position, and a second magnet disposed to align with the base magnetic element in the open position.

34. A mobile device according to claim 33 wherein the plurality of slide magnets further comprises at least one intermediate magnet disposed to align with the base magnetic element at an intermediate position between the closed position and the open position.

35. A mobile device according to claim 34 wherein the at least one of the plurality of slide magnets having a reversed polarity is disposed at the intermediate position.

36. A mobile device according to claim 32, further comprising a slide magnetically active element configured in spatial relation to at least one of the plurality of slide magnets such that magnetic forces between the at least one of the plurality of slide magnets and the at least one base magnetic element are affected.

37. A mobile device according to claim 36, wherein the slide magnetically active element is a steel sheet in a plane of the slide magnets, the steel sheet provided with cut-out portions configured for receiving the slide magnets.

38. A mobile device according to claim 37, wherein the steel sheet is also provided with oblong cut-out portions connecting the cut-out portions for the slide magnets.

* * * * *